US006819856B2

(12) United States Patent
Dagley et al.

(10) Patent No.: US 6,819,856 B2
(45) Date of Patent: Nov. 16, 2004

(54) HIGH DENSITY FIBER OPTIC DISTRIBUTION FRAME

(75) Inventors: Mark R. Dagley, Ft. Worth, TX (US); Lee W. Nored, Denton, TX (US); Antwan J. Works, Lewisville, TX (US); Saul L. Rodolfo, Saginaw, TX (US); Jon P. Segelhorst, Watauga, TX (US); Tuy T. Nguyen, Euless, TX (US); Jennifer D. Burns, Ft. Worth, TX (US); Donald G. Davidson, Ft. Worth, TX (US); Jason B. Reagan, The Colony, TX (US); Brett A. Menke, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/379,739

(22) Filed: Mar. 5, 2003

(65) Prior Publication Data

US 2004/0175089 A1 Sep. 9, 2004

(51) Int. Cl.[7] ................................................ G02B 6/00
(52) U.S. Cl. ...................... 385/134; 385/135; 385/136; 385/137
(58) Field of Search ................................ 439/134, 135, 439/136, 137

(56) References Cited

U.S. PATENT DOCUMENTS

| | | | |
|---|---|---|---|
| 4,765,710 A | 8/1988 | Burmeister et al. | ......... 350/96.2 |
| 5,220,600 A | 6/1993 | Chouanard et al. | ......... 379/327 |
| 5,402,515 A | 3/1995 | Vidacovich et al. | ......... 385/135 |
| 5,497,444 A | 3/1996 | Wheeler | ......... 385/135 |
| 5,717,810 A | 2/1998 | Wheeler | ......... 385/135 |
| 5,758,003 A | 5/1998 | Wheeler et al. | ............. 385/134 |
| 5,946,440 A | 8/1999 | Puetz | ........................ 385/135 |
| 6,201,919 B1 | 3/2001 | Puetz et al. | .................. 385/134 |
| 6,223,909 B1 | 5/2001 | Mendoza | ..................... 211/26 |
| 6,321,917 B1 | 11/2001 | Mendoza | ..................... 211/26 |
| RE37,489 E | 1/2002 | Anton et al. | ................... 385/53 |
| 6,360,050 B1 * | 3/2002 | Moua et al. | ................. 385/135 |
| 6,467,633 B1 | 10/2002 | Mendoza | ..................... 211/26 |
| 6,468,112 B1 | 10/2002 | Follingstad et al. | ......... 439/719 |

(List continued on next page.)

FOREIGN PATENT DOCUMENTS

WO          WO02/21181          3/2002          ............ G02B/6/36

OTHER PUBLICATIONS

ADC, The Broadband Company™; "Fiber Main Distributing Frame (FMDF)"; p. 1; Feb. 28, 2003.

(List continued on next page.)

Primary Examiner—Chandrika Prasad
(74) Attorney, Agent, or Firm—Christopher C. Dremann

(57) ABSTRACT

A high density fiber optic distribution frame includes a frame assembly, one or more left-hand connector module housings mounted on the frame assembly, one or more right-hand connector module housings mounted on the frame assembly and an Interbay Storage Unit (IBU) positioned on the frame assembly medially between the left-hand connector module housings and the right-hand connector module housings. Each connector module housing includes a mounting frame and at least one connector module having at least one fiber optic adapter for interconnecting optical fibers between connector modules on the distribution frame. The connector module is movable between a stowed position wherein the fiber optic adapter is not accessible and a deployed position wherein the fiber optic adapter is accessible. The distribution frame maintains the minimum bend radius of the optical fiber transitioned between connector modules, and reduces the length of a single length jumper employed on the frame.

33 Claims, 34 Drawing Sheets

U.S. PATENT DOCUMENTS

| | | | | |
|---|---|---|---|---|
| 6,532,332 B2 | * | 3/2003 | Solheid et al. | 385/134 |
| 6,591,051 B2 | * | 7/2003 | Solheid et al. | 385/134 |
| 6,625,373 B1 | | 9/2003 | Wentworth et al. | 385/134 |
| 6,633,717 B1 | | 10/2003 | Knight et al. | 385/135 |
| 6,633,718 B1 | | 10/2003 | Thom | 385/136 |

OTHER PUBLICATIONS

ADC, The Broadband Company™; "Interbay Management Panels"; p. 1; Feb. 28, 2003.

ADC, The Broadband Company™; "NGF–EBA5SB07E Stand–off Bracket"; p. 1; Feb. 28, 2003.

Corning Cable Systems Product Sheet' "Mass Termination Xchange (MTX) Frame"; p. 1; May 2002.

Telect, Inc.; "Advanced Distribution Frame (ADF)"; pp. 1–2; Feb. 28, 2003.

Telect, Inc.; "ADF Frames"; pp. 1–2; Feb. 28, 2003.

Telect, Inc.; "ADF Interbay Storage Panel"; p. 1; Feb. 28, 2003.

Telect, Inc.; "ADF Modules"; p. 1; Feb. 28, 2003.

* cited by examiner

HIGH DENSITY FIBER OPTIC DISTRIBUTION FRAME

FIELD OF THE INVENTION

The invention relates to distribution frames for use in a communications network. More, particularly, the invention is an improved high density fiber optic distribution frame for interconnecting optical fibers in a communications network.

BACKGROUND OF THE INVENTION

Distribution frames are widely utilized, for example in a building communications network, to interconnect optical fibers. Such distribution frames are sometimes also referred to as "termination" or "cross-connect" frames because they include connector modules having adapters and jumper cables or "jumpers" that extend between two connector modules to interconnect optical fibers terminated at adapters within the connector modules. The increasing demand for communications services, particularly within office buildings and technology centers, requires that new distribution frames be able to interconnect a greater number of optical fibers. This requirement is commonly referred to as "termination density" and frames meeting the requirement are commonly referred to as "high density" distribution frames. Numerous high density fiber optic distribution frames are known including the Advanced Distribution Frame (ADF) available from Telect, Inc. of Liberty Lake, Wash., USA and the Fiber Main Distributing Frame (FMDF) available from ADC Telecommunications, Inc. of Eden Prairie, Minn., USA. Such distribution frames are shown and described in many prior United Sates patents, including for exampxle, U.S. Pat. No. 6,360,050 assigned to Telect, Inc., and U.S. Pat. Nos. 5,758,003, 5,717,810 and 5,497,444 assigned to ADC Telecommunications, Inc.

Each of the known high density fiber optic distribution frames, however, has certain deficiencies and none provides a combination of features necessary to address all of the deficiencies. For example, the known distribution frames are typically not compatible with existing fiber optic hardware, commonly referred to as "legacy" hardware. In particular, the existing distribution frames are not compatible with legacy connector housings, such as LGX® connector housings available from American Telephone and Telegraph Corporation (AT&T Corp.) of New York, N.Y. or LDC™ connector housings available from Corning Cable Systems LLC of Hickory, N.C.

In addition, the known distribution frames do not include a frame assembly that adequately controls the bend radius of the optical fiber as the jumpers transition on the frame between connector modules. Control of the bend radius of the optical fiber is essential to prevent damage that degrades the transmission characteristics of the optical signal being transmitted over the optical fiber. Stated differently, the known distribution frames include a frame assembly that exceeds the minimum bend radius of the optical fiber at some point along the path of travel of the jumpers between connector modules.

Further, the known distribution frames do not include an Interbay Fiber Manager (IFM) that can be readily configured with the distribution frame for convenient storage and routing of optical fiber, while maintaining the minimum bend radius of the optical fiber. Still further, the known distribution frames typically employ a single length jumper for convenience and ease of manufacture. The length of the single length jumper must be long enough to extend between the connector modules that are positioned farthest apart on the distribution frame. As a result, the majority of the jumpers are longer than necessary and the slack lengths of the jumpers must be stored on the distribution frame. The slack lengths of the jumpers tend to accumulate, or "pile-up," adjacent the base of the distribution frame, thereby unnecessarily increasing the lateral and depth dimensions of the frame.

The present invention addresses each of the aforementioned deficiencies, as well as others. Accordingly, the invention provides an improved high density fiber optic distribution frame for interconnecting optical fibers in a communications network.

BRIEF DESCRIPTION OF THE DRAWINGS

The present invention will be described in conjunction with the accompanying drawings in which like reference numerals represent the same or similar parts in the various views. The drawings, which are incorporated in and constitute a part of this specification, provide a further understanding of the invention, illustrate various embodiments of the invention, and, together with the description, help to fully explain the principles and objects thereof. More specifically:

FIG. 4 is a right-side elevation view of the frame assembly shown in FIG. 2, the left-side elevation view being substantially similar;

FIG. 14 is a right-side elevation view of the frame assembly shown in FIG. 12, the left-side elevation view being substantially similar;

FIG. 21 is a right-side elevation view of the IFM shown in FIG. 19, the left-side elevation view being substantially similar;

DETAILED DESCRIPTION OF EMBODIMENTS OF THE INVENTION

Figure 1:
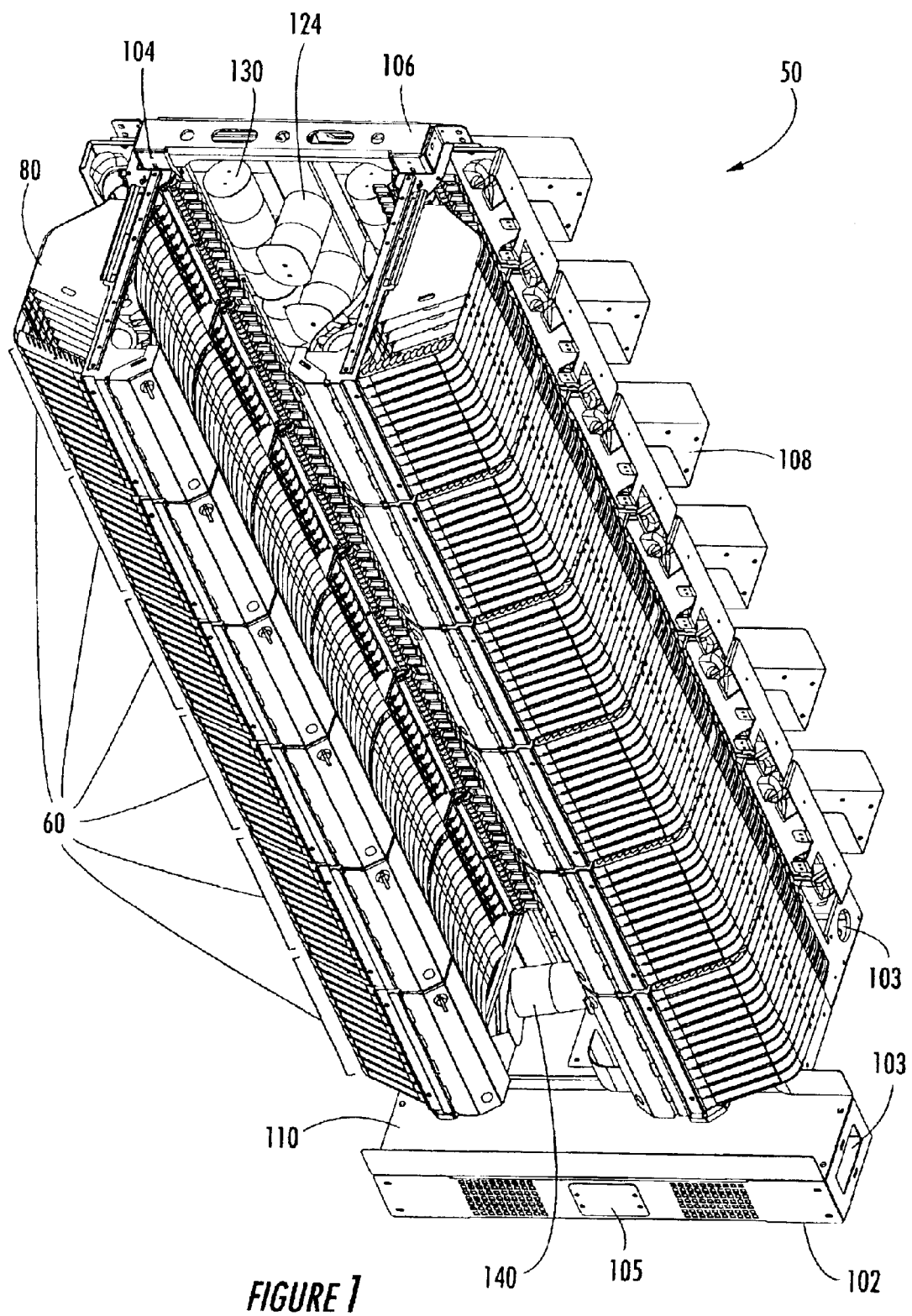
FIG. 1 is a front perspective view of a frame assembly constructed in accordance with an exemplary embodiment of the invention.
Figure 2:
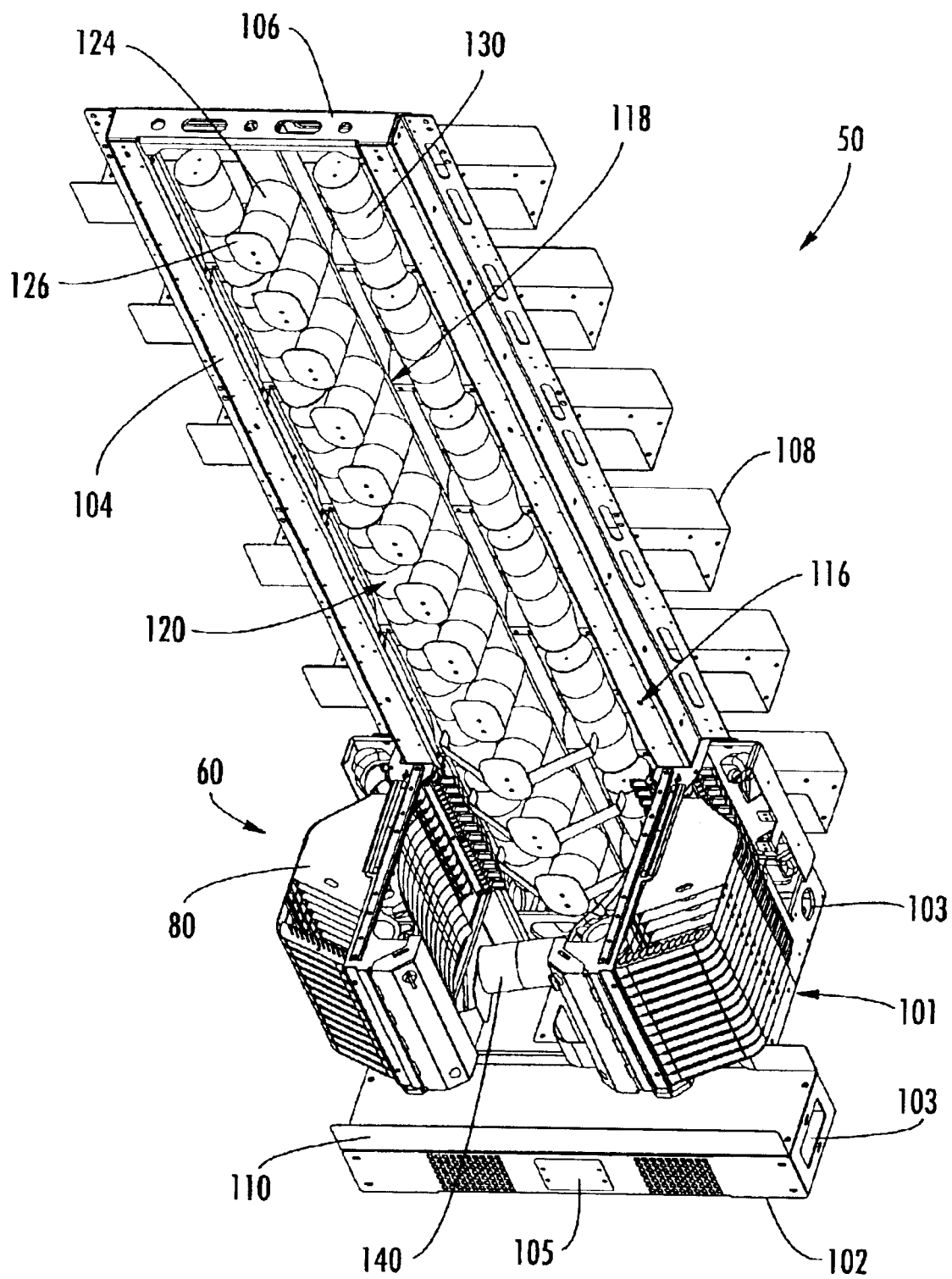
FIG. 2 is a front perspective view of the frame assembly of FIG. 1 shown with only the lowermost connector module housings installed for purposes of greater clarity.

The invention is described in greater detail hereinafter with reference to the accompanying drawings, in which various exemplary embodiments of the invention are shown. The invention may, however, be embodied in many different forms, and therefore, should not be construed as being limited to the embodiments described and shown herein. Exemplary embodiments are set forth herein so that this description will be thorough and complete and will fully convey the best mode and intended scope of the claimed invention, while enabling those skilled in the art to make and practice the invention without undue experimentation. Like reference numerals are utilized throughout the drawing figures to identify the same or similar parts in the embodiments shown and described. However, no particular significance should be afforded the reference numbers. Likewise, no particular significance should be afforded to the relative size or scale of the components depicted in the drawing figures, unless specifically indicated otherwise.

Referring now to the accompanying drawings, an exemplary embodiment of a high density fiber optic distribution frame, constructed in accordance with the invention and indicated generally at 50, is shown in FIGS. 1–11. The distribution frame 50 is of the type typically utilized to interconnect optical fibers and/or fiber optic cables within a building communications system, or network, and is commonly termed a "fiber optic termination frame" or "fiber optic distribution frame." Examples of high density fiber optic distribution frames include the Advanced Distribution Frame (ADF) available from Telect, Inc. of Liberty Lake, Wash., USA and the Fiber Main Distributing Frame (FMDF) available from ADC Telecommunications, Inc. of Eden Prairie, Minn., USA. Such distribution frames are shown and described in many prior United States patents, including for example, U.S. Pat. No. 6,360,050 assigned to Telect, Inc. and U.S. Pat. Nos. 5,758,003, 5,717,810 and 5,497,444 assigned to ADC Telecommunications, Inc. Another exemplary embodiment of a distribution frame, constructed in accordance with the invention and indicated generally at 150, is shown in FIGS. 12–15. Yet another exemplary embodiment of a distribution frame, constructed in accordance with the invention and indicated generally at 250, is shown in FIGS. 16–23. Details of the various embodiments are shown in the remaining FIGS. 24–44. The various embodiments shown and described herein, however, are merely illustrative of numerous configurations in which a distribution frame according to the invention may be constructed.

The distribution frame 50 shown in FIGS. 1–11 defines a first horizontal, or lateral, direction, a vertical, or height, direction and a second horizontal, or depth, direction is generally orthogonal to the lateral and height directions. As shown, the lateral dimension of the distribution frame 50 is about 30 inches, the height dimension is about 84 inches and the depth dimension is about 24 inches. However, the specific directions and dimensions referred to herein are utilized merely for convenience of the following detailed description of the invention and the orientation and overall size of the distribution frame 50 is not intended to be limited in any manner. For example, the distribution frame 50 could be oriented laterally and supported at each end by vertically oriented supports, at least one of which comprises means for routing optical fibers and/or fiber optic cables to and from the distribution frame 50. As will be readily apparent to those of skill in the art, the distribution frame 50 may be employed to terminate and distribute any type of optical fiber or fiber optic cable, referred to herein as "optical fiber." As used herein, the term "optical fiber" refers generically to any type of optical fiber or fiber optic cable, including bare optical fiber, jacketed optical fiber, loose-tube fiber optic cable having one or more optical fibers, tight-buffered fiber optic cable having one or more optical fibers, fiber optic ribbon (i.e., ribbonized optical fiber and fiber optic cable) and fiber optic jumpers or jumper cables having one or more optical fibers. As shown and described herein, the distribution frame 50 terminates connectorized optical fibers to fiber optic jumpers at fiber optic adapters in a known distribution manner commonly referred to as a "cross-connect." However, the distribution frame 50 may be employed to terminate and distribute optical fiber in any manner, including for example, but not by way of limitation, mechanical or fusion splicing a bare optical fiber to an optical fiber having a connector on the other end for distribution on a patch panel.

In FIG. 1, distribution frame 50 is shown fully populated with connector module housings 60, and each connector module housing 60 is shown fully populated with connector modules 80. In particular, distribution frame 50 is populated with 6 left-hand connector module housings and 6 right-hand connector module housings. Each left-hand connector module housing is populated with 12 left-hand connector modules and each right-hand connector module housing is populated with 12 right-hand connector modules. The left-hand connector module housings and the right-hand connector module housings are mirror images of one another, but are otherwise identical. Similarly, the left-hand connector modules and the right-hand connector modules are mirror images of one another, but are otherwise identical. Furthermore, each of the 6 left-hand connector module housings is identical and each of the 12 left-hand connector modules is identical. Accordingly, only a representative left-hand connector module housing (referred to hereinafter simply as connector module housing 60 or housing 60) and a representative left-hand connector module (referred to hereinafter simply as connector module 80 or module 80) need be described in detail. It should be assumed, unless indicated otherwise, that the structure and features of the representative connector module housing 60 and the representative connector module 80 described herein are equally applicable to each of the connector module housings and connector modules disposed on the distribution frame 50.

The distribution frame 50 may be configured with any number of connector module housings 60, and each connector module housing may be configured with any number of connector modules 80. In this manner, the distribution frame 50 can be initially configured with the minimum number of connector module housings 60 and connector modules 80 necessary to accommodate the building telecommunications network. Thereafter, the distribution frame 50 may be configured with additional connector module housings 60 and connector modules 80 as necessary to accommodate the growth of the building telecommunications network. Preferably, each connector module 80 is configured to house up to 12 fiber optic adapters 90, as will be described in greater detail hereinafter, that each connect a pair of optical fibers. As a result, the fully populated distribution frame 50 can have up to 1728 fiber optic adapters 90 with the capacity to interconnect and cross-connect up to 1728 pairs of optical fibers. Thus, the distribution frame 50 may be described as a "high density" fiber optic distribution frame having a termination capability of up to 1728 fiber optic adapters.

Figure 4:
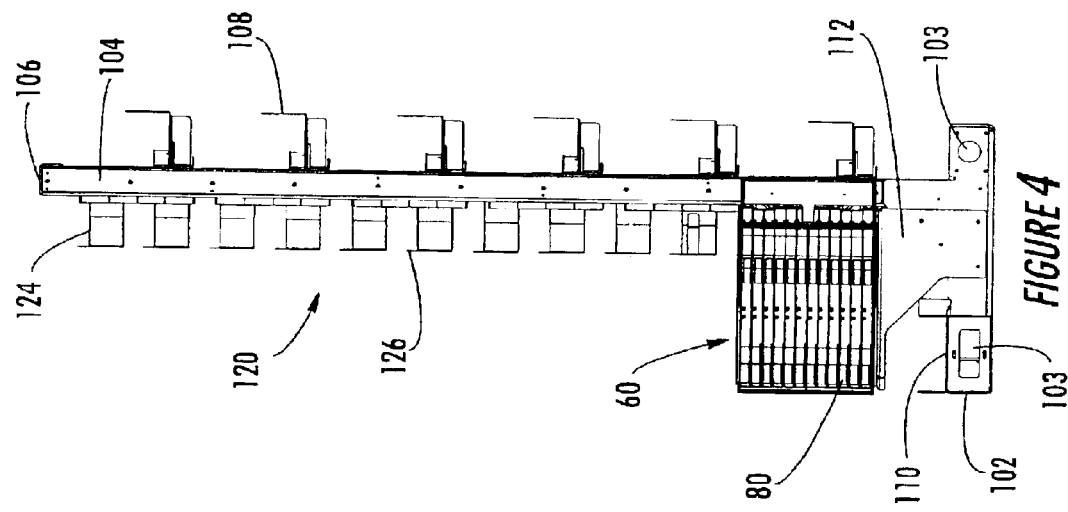
Figure 5:
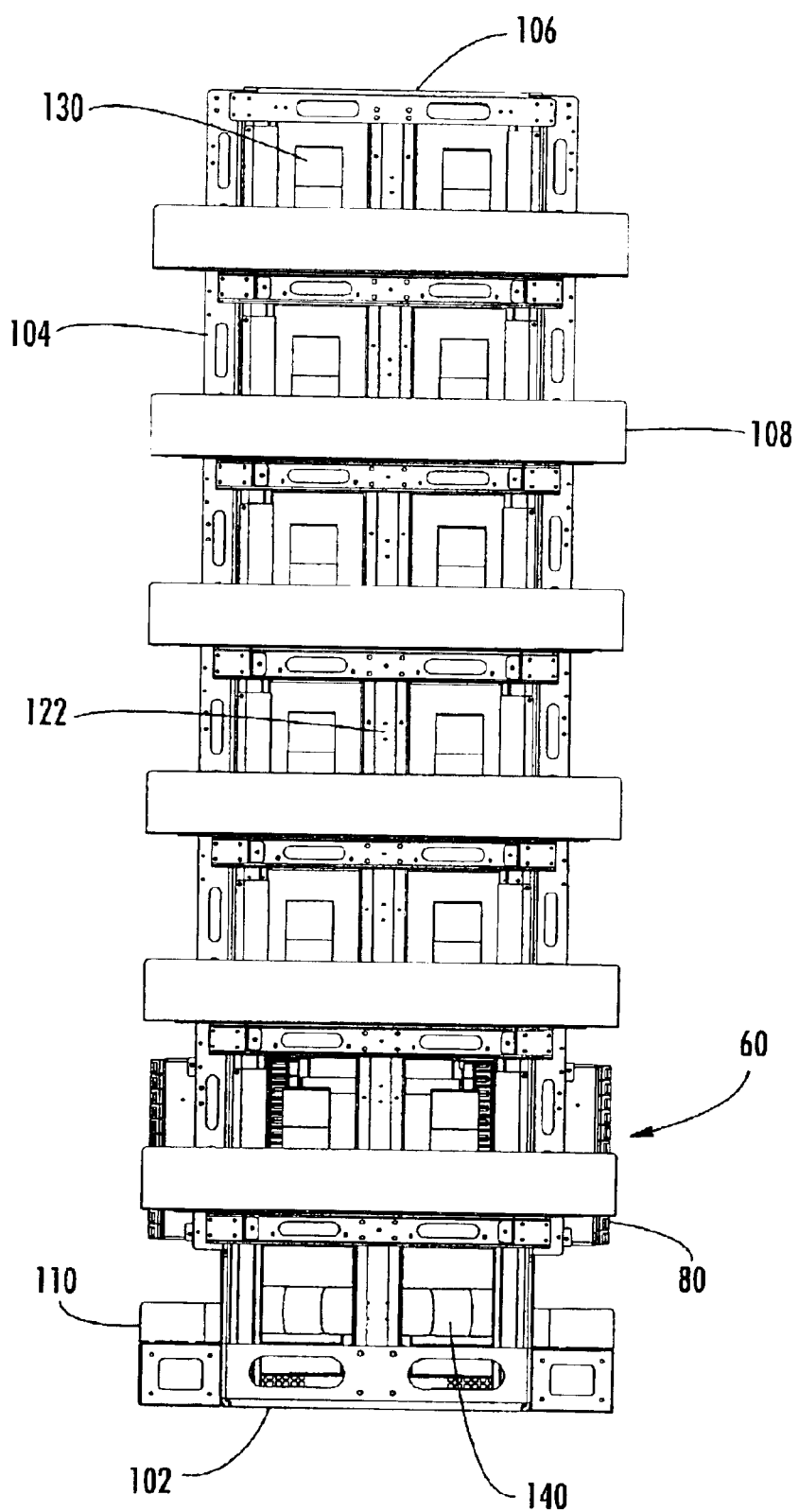
FIG. 5 is a rear elevation view of the frame assembly shown in FIG. 2.

As best shown in FIGS. 8–11, the distribution frame 50 comprises a frame assembly 100 on which the connector module housings 60 are mounted. In FIGS. 2–7, the distribution frame 50 is shown with only the lowermost left-hand connector module and the lowermost right-hand connector module for purposes of greater clarity. The frame assembly 100 comprises a base 102, at least a pair of uprights 104 depending from the base 102 and at least one cross member 106 extending between the uprights 104. Typically, the base 102 is positioned on a horizontal surface, such as the floor of a building, and the uprights 104 depend vertically upward from the base 102. Each cross member 106 extends laterally, and preferably horizontally, between the uprights 104 to stiffen the frame assembly 100 against lateral and torsion loads. The uprights 104 and cross members 106 are designed with sufficient strength and stiffness such that the distribution frame 50 meets or exceeds any industry or governmental seismic requirements. As shown, the frame assembly 100 further comprises one or more rear troughs 108 extending laterally, and preferably horizontally, between the uprights 104. As best seen in FIG. 5, the rear troughs 108 are provided at predetermined intervals and heights above the base 102, for a purpose to be described hereinafter. The rear troughs 108 transition optical fiber, and particularly jumpers, laterally on the distribution frame 50 and between adjacent distribution frames (e.g., cross-connect). The rear troughs 108 also provide lateral and torsional stiffness in addition to that provided by the cross members 106. As shown, the frame assembly 100 further comprises an optional front trough 110 located on a forward portion of the base 102. The front trough 110 extends laterally, and preferably horizontally and generally parallel to the rear troughs 108, to transition optical fiber, and particularly jumpers, laterally between adjacent distribution frames or between the distribution frame 50 and an Interbay Fiber Manager 320, to be described hereinafter with reference to FIGS. 16–23.

Figure 3:
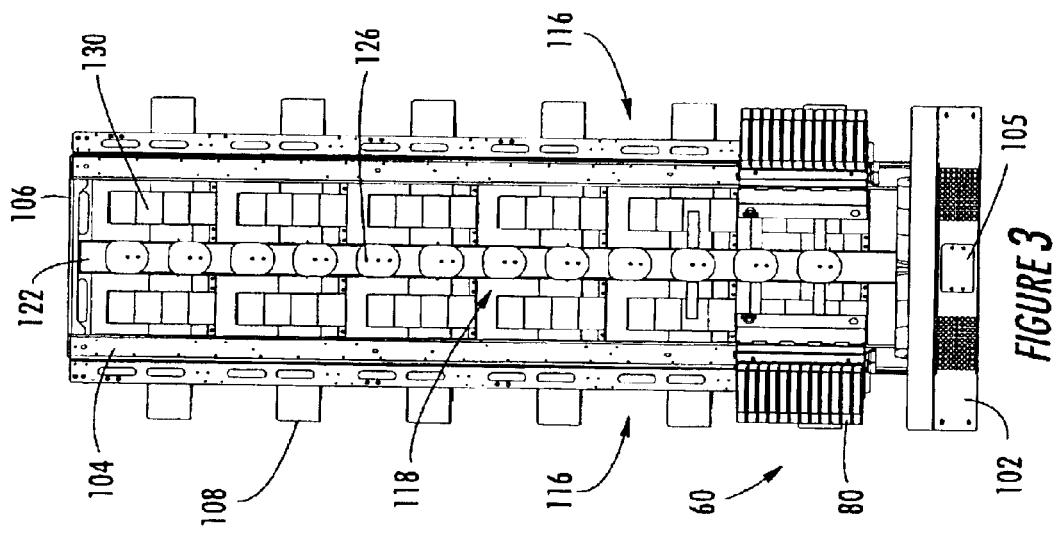
FIG. 3 is a front elevation view of the frame assembly shown in FIG. 2.
Figure 6:
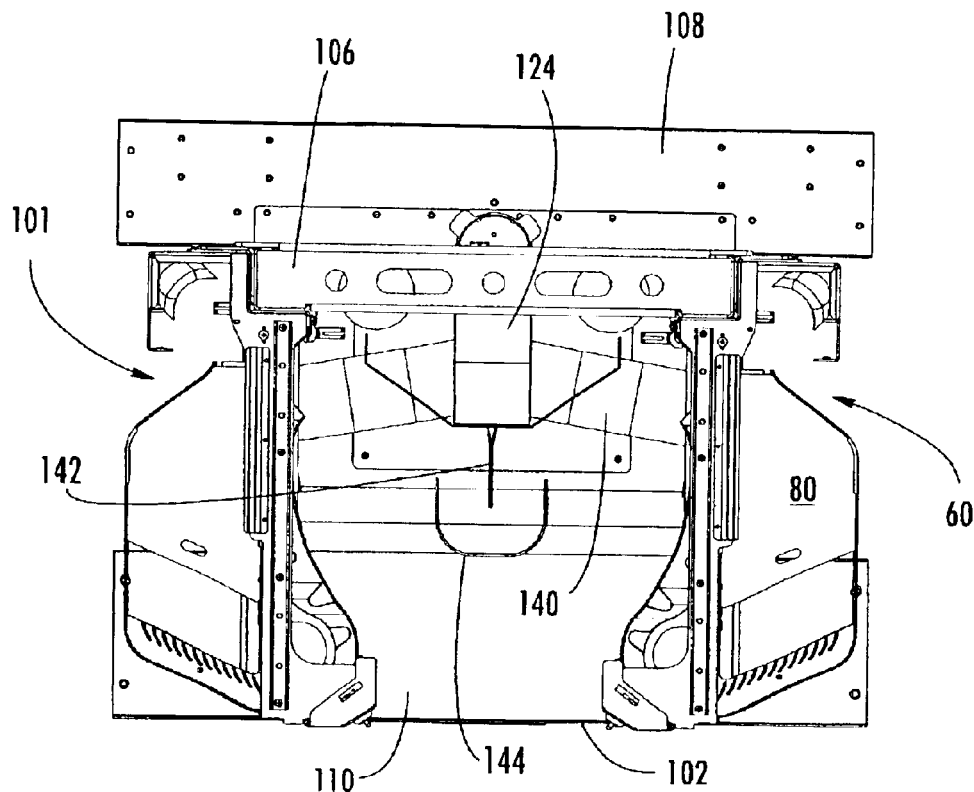
FIG. 6 is a top plan view of the frame assembly shown in FIG. 2.
Figure 7:
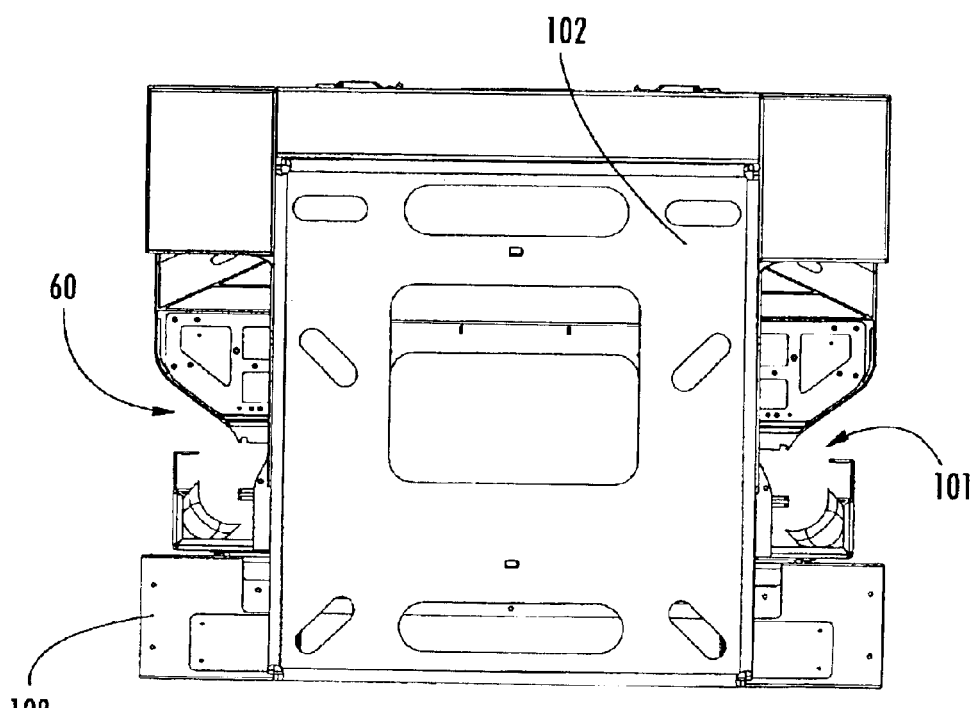
FIG. 7 is a bottom plan view of the frame assembly shown in FIG. 2.

As best shown in FIGS. 6 and 7, the base 102 is generally rectangular, but may be provided with cutouts 101 for permitting fiber optic cables (not shown) to be routed to and from the distribution frame 50. For example, one or more service cables may be routed from below onto the distribution frame 50 through the cutout 101 provided on one lateral side and one or more distribution, or drop, cables may be routed off the distribution frame 50 through the cutout 101 provided on the other lateral side. The service cable(s) and the drop cable(s), however, are more typically routed from above onto the distribution frame 50 between the uprights 104 and the rear and sides of the connector module housings 60, and specifically, on the outside of the connector module housings 60, as will be described. The base 102 has numerous "lightening" holes for reducing the weight of the frame assembly 100 without adversely affecting the strength and stiffness of the distribution frame 50. As best shown in FIGS. 3 and 4, the base 102 has one or more lateral openings 103 for permitting electrical cables to pass between adjacent distribution frames. The base 102 also has an opening 105 (shown covered by an access plate) at the front of the base 102 for accessing an electrical outlet provided vertically beneath the front trough 110. Although not shown, a similar opening may also be provided at the rear of the base 102 for accessing an electrical outlet provided vertically beneath the rear troughs 108. Additional openings may be provided laterally on the base 102 as necessary to permit routing of electrical cables between the front of the base 102 and the rear of the base 102. Furthermore, the base 102 may be provided with a variety of structural elements for attaching the base 102 of the distribution frame 50 to the base of an adjacent distribution frame or to the base of an adjacent Interbay Fiber Manager 320, to be described hereinafter.

In FIGS. 8–11, only the lower portion of the frame assembly 100 is shown and the connector module housings 60 and the connector modules 80 are removed for purposes of grater clarity. The connector module housings 60 and the connector modules 80 are removed primarily to show the components of the frame assembly 100 that are attached to the base 102 between the uprights 104 and the front trough 110. In particular, left-hand and right-hand connector module housing support gussets 112 are secured to the base 102, for example by threaded bolts or by welding. As shown, the support gussets 112 are generally anvil-shaped to conform to the contours of the cutout 101 and the front trough 110. Regardless, the support gussets 112 extend upwardly from the base 102 to a height sufficient to clear the top of the front trough 110. The support gussets 112 are provided with upper flanges on which left-hand and right-hand connector module support rails 114 are secured, for example by threaded bolts or by welding. The support rails 114 extend forwardly from the uprights 104 above the front trough 110 to approximately the front edge of the base 102. As will be described in greater detail hereinafter, each of the lowermost connector module housings 60 is provided with a support rail 63 that overlies the corresponding support rail 114. The support rail 63 is secured to the support rail 114 (or visa versa) along the support gussets 112 so that the connector module housing 60 is securely mounted on the frame assembly 100. A pair of angled IBU routing hubs 140, an angled IBU routing hub support bracket 142 and a front trough center routing guide 144 are also positioned on the base 102 between the support gussets 112. The angled IBU routing hubs 140, the angled IBU routing hub support bracket 142 and the front trough center routing guide 144 will be described in greater detail hereinafter.

The uprights 104 are spaced laterally and positioned rearwardly on the base 102 so as to provide a substantially open mounting area on the distribution frame 50 forward of the uprights 104. Thus, the base 102 and the uprights 104 of the frame assembly 100 define one or more fiber connection areas 116 forward of the uprights 104 in which the connector module housings 60 are located, and a fiber management area 118 positioned between the uprights 104 in which lengths of optical fiber, and in particular fiber optic jumper cables (also referred to herein as "fiber optic jumpers" or "jumpers") are routed and stored. Preferably, left-hand and right-hand fiber connection areas 116 are defined by the frame assembly 100 and the fiber management area 118 is located medially between the left-hand fiber connection area and the right-hand fiber connection area. As shown herein in FIGS. 1–11, the left-hand fiber connection area is occupied predominantly by the left-hand connector module housings and the right-hand fiber connection area is occupied predominantly by the right-hand connector module housings. In other embodiments of the invention contemplated, but not shown herein, the frame assembly 100 may comprise a fiber management area 118 and a single fiber connection area 116 occupied predominantly by one or more left-hand connector module housings, or a fiber management area 118 and a single fiber connection area 116 occupied predominantly by one or more right-hand connector modules. Furthermore, the fiber management area 118 may be removed from the distribution frame 50 entirely and located remotely, or on an adjacent distribution frame.

As previously mentioned, the distribution frame 50 comprises at least one connector module housing 60. In the embodiment shown in FIGS. 1–11, the fiber connection areas 116 comprise one or more left-hand connector modules housings and one or more right-hand connector modules. Each left-hand connector module housing is fixedly secured to the left-hand upright and each right-hand connector module housing is fixedly secured to the right-hand upright in a manner to be described hereinafter. The fiber management area 118 comprises an Interbay Storage Unit (IBU) 120 located medially between the left-hand connector module housings and the right-hand connector module housings. The IBU 120 stores lengths of optical fiber, and in particular fiber optic jumpers, that are routed between the connector modules 80. Typically, the IBU 120 stores jumpers that are routed between a fiber optic adapter housed within one of the left-hand connector modules and a fiber optic adapter housed within one of the right-hand connector modules. However, the IBU 120 may also be utilized to route and store jumpers between any two left-hand connector modules or any two right-hand connector modules, or between connector modules 80 mounted on adjacent distribution frames.

The IBU 120 comprises a vertical member 122 (FIG. 3, FIG. 5) that is secured to the base 102 and to at least one of the cross members 106. The vertical member 122 is secured at its lower end to the base 102 and at its upper end to the uppermost cross member 106. The vertical member 122 may also be secured to other cross members 106 located between the base 102 and the uppermost cross member 106. The IBU 120 further comprises a plurality of horizontal IBU hubs 124 extending outwardly from the vertical member 122. In the embodiment shown in FIGS. 1–11, there are 12 horizontal IBU hubs 124. Each of the horizontal IBU hubs 124 has a predetermined radius at least along its upper surface to maintain the minimum bend radius of the jumpers that are routed over the horizontal IBU hub 124, as will be described. Preferably, the horizontal IBU hubs 124 are cylindrical and have a radius of at least about 1.5 inches. As shown, each of the horizontal IBU hubs 124 is provided with a hub cap 126 for preventing the jumpers from sliding off the horizontal IBU hub 124 in a direction away from the vertical member 122. The hub cap 126 covers the free end of the horizontal IBU hub 124 and extends above the upper surface of the horizontal IBU hub 124 (e.g., FIG. 10). The hub cap 126 may be fixedly secured to the free end of the horizontal IBU hub 124. Alternatively, the hub cap 126 may be movably attached to the horizontal IBU hub 124 to assist in the removal of jumpers from the horizontal IBU hub 124. For example, the hub cap 126 may be vertically slideable so that the hub cap 126 may be moved downwardly towards the base 102 to assist in the removal of a jumper. Furthermore, the hub cap 126 may be spring-loaded such that it may be temporarily displaced downwardly to remove a jumper, but is biased upwardly away from the base 102 so that the hub cap 126 automatically returns to the position shown herein. As the distribution frame 50 becomes more fully populated with terminations, a large number of jumpers will be routed between the connector modules 80 and the IBU 120. As a result, there will be a buildup of jumpers commonly referred to in the art as "jumper pile-up." Normally, jumper pile-up is greatest between the connector module housings 60 adjacent the base 102 of the distribution frame 50. Accordingly, one or more of the lower hub caps 126 may be provided with retaining fingers 128 for retaining the larger number of jumpers on the lower horizontal IBU hubs 124 of the IBU 120 and away from the connector module housings 60. As shown herein, the lowermost three horizontal IBU hubs 124 are each provided with a pair of retaining fingers 128 that extend laterally outward from the hub cap 126 in the direction of the connector module housings 60. At the same time, the retaining fingers 128 are angled rearwardly in the direction of the uprights 104. Furthermore, the free ends of the retaining fingers 128 may terminate in end portions 127 that are generally parallel to the axis of the horizontal IBU hub 124.

The frame assembly 100 further comprises a plurality of vertical IBU routing hubs 130 positioned between each of the fiber connection areas 116 and the fiber management area 118. In the embodiment shown in FIGS. 1–11, there are 6 vertical IBU routing hubs 130 equally spaced and disposed between the IBU 120 and the left-hand connector module housings and 6 vertical IBU routing hubs 130 equally spaced and disposed between the IBU 120 and the right-hand connector module housings. Preferably, the number of vertical IBU routing hubs 130 corresponds to the number of connector module housings 60 of a fully populated distribution frame 50. Accordingly, in the embodiment shown in FIGS. 1–11, there are a total of 12 vertical IBU routing hubs 130. As will be described more fully hereinafter, the vertical IBU routing hubs 130 transition optical fiber, and particularly jumpers, between the connector modules 80 and the IBU 120. Each of the vertical IBU routing hubs 130 has a predetermined radius at least along its rear surface to maintain the minimum bend radius of the jumpers that are routed around the vertical IBU routing hubs 130. Preferably, the vertical IBU routing hubs 130 are cylindrical and have a radius of at least about 1.5 inches.

Figure 8:
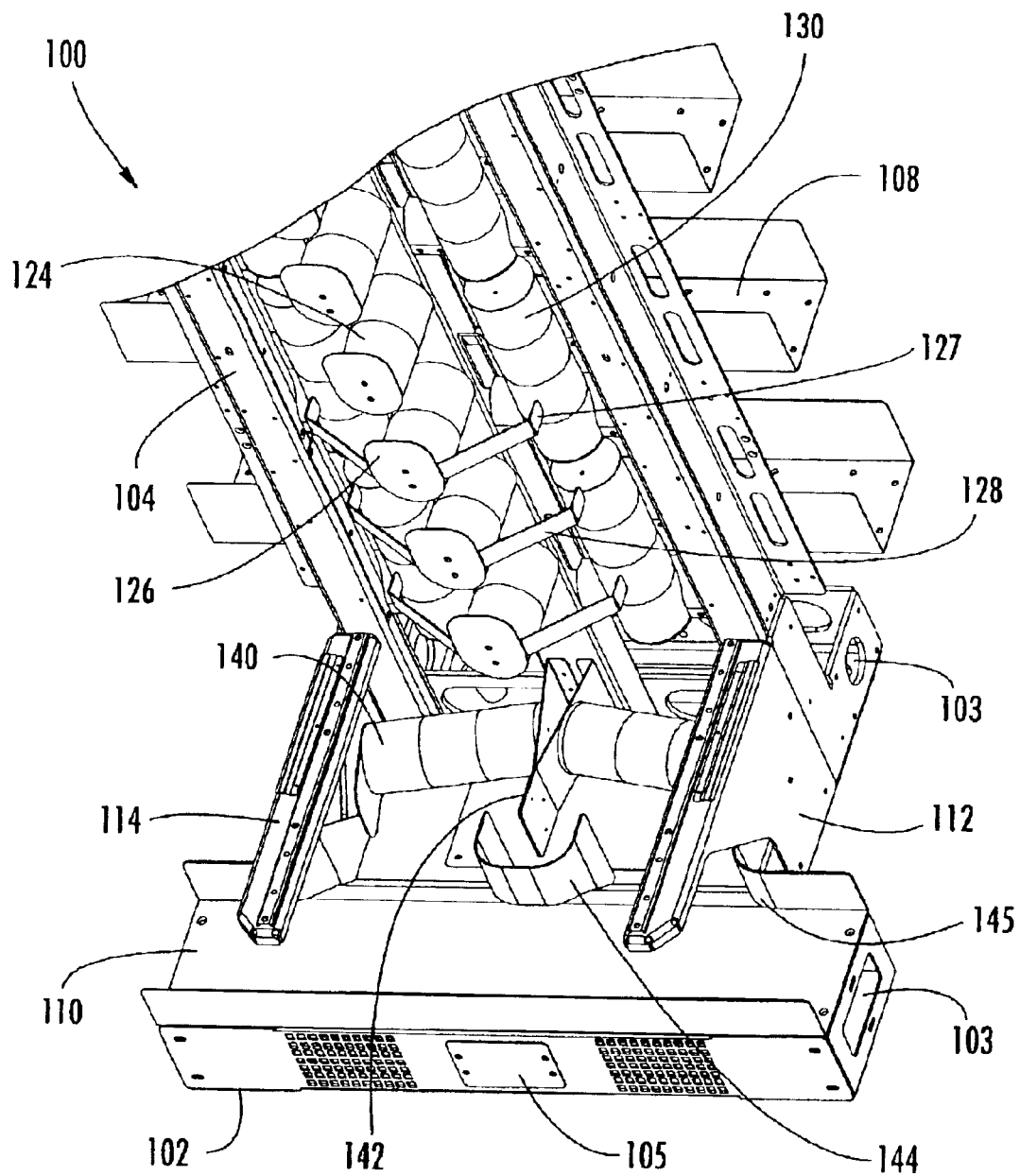
FIG. 8 is a perspective view of the lower portion of the frame assembly of FIG. 1 shown with the connector module housings removed for purposes of greater clarity.
Figure 10:
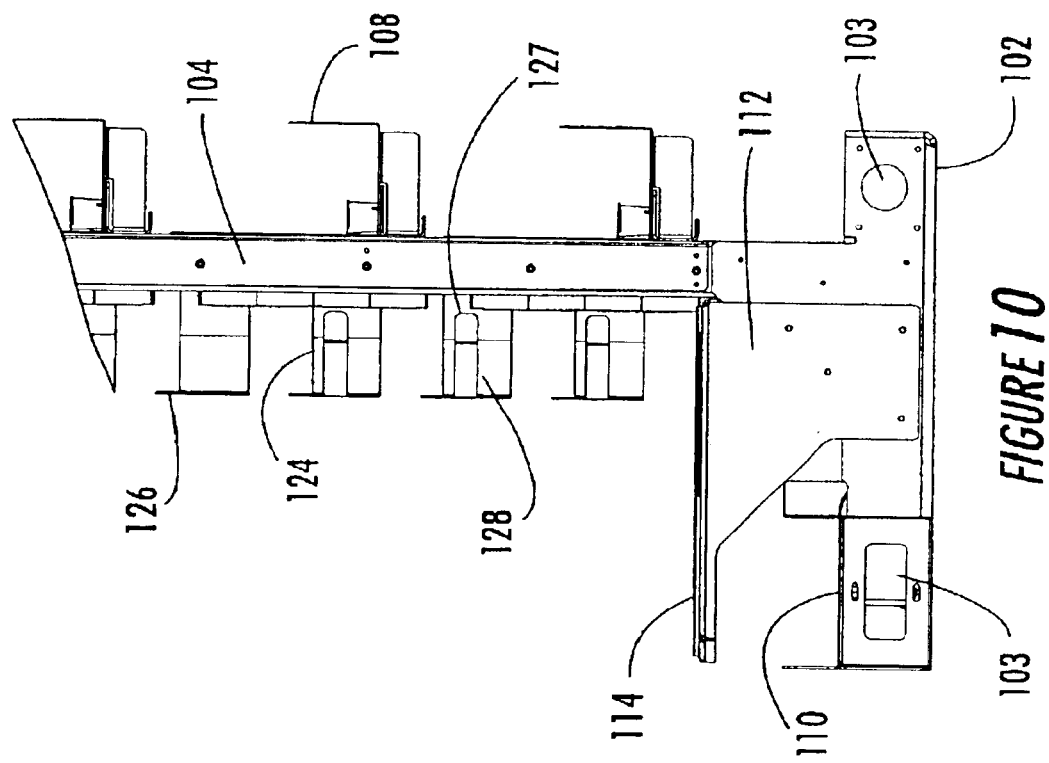
FIG. 10 is a right-side elevation view of the lower portion of the frame assembly shown in FIG. 8, the left-side elevation view being substantially similar, FIG. 11 is a rear elevation view of the lower portion of the frame assembly shown in FIG. 8.
Figure 9:
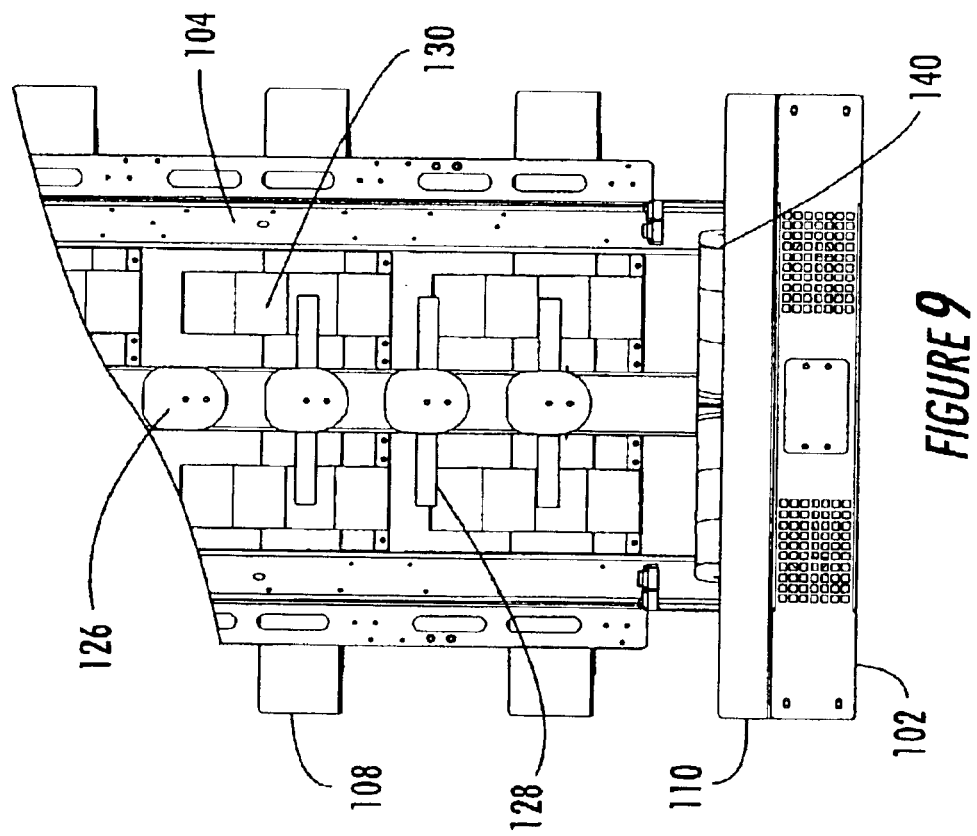
FIG. 9 is a front elevation view of the lower portion of the frame assembly shown in FIG. 8.
Figure 11:
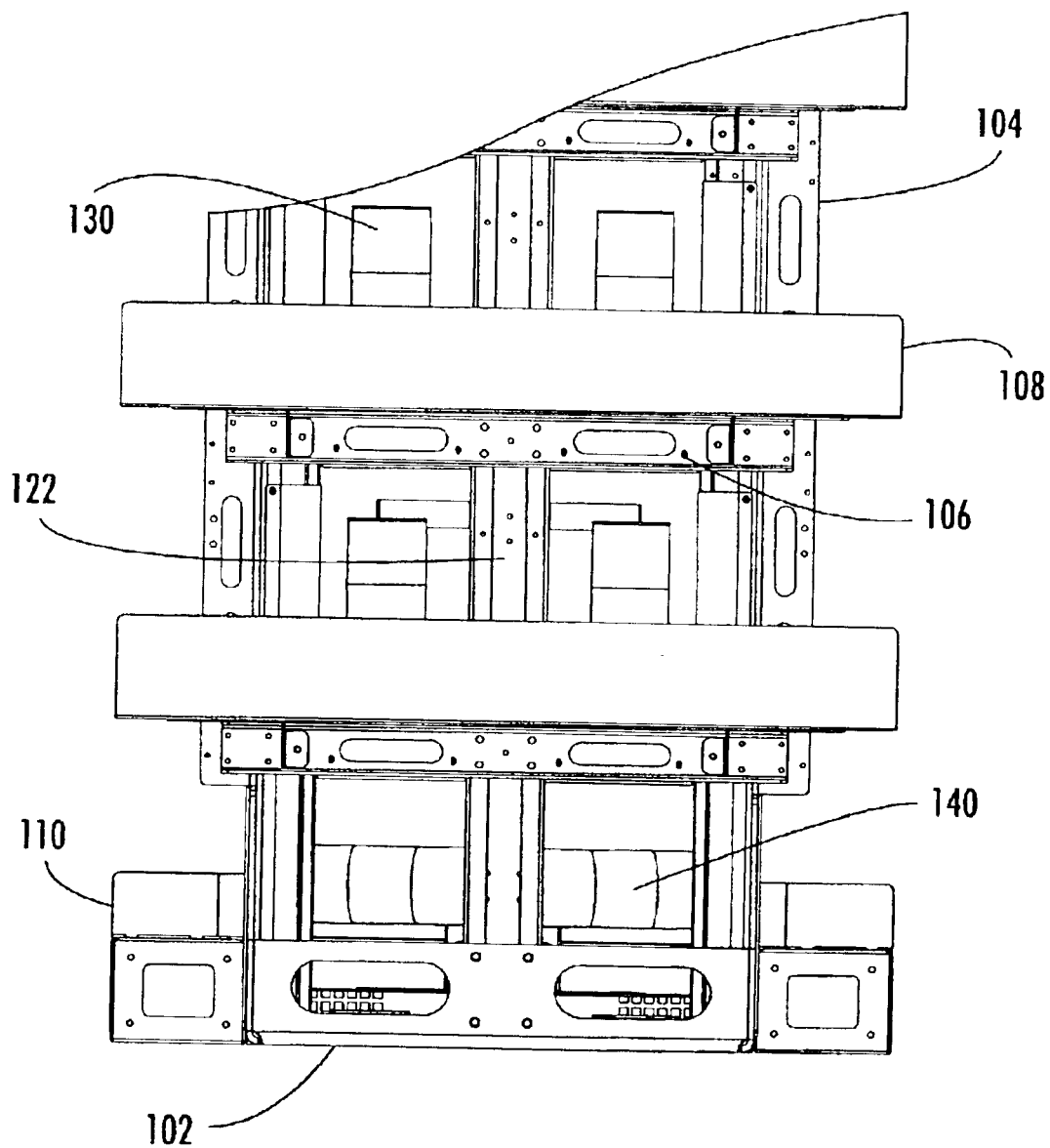

As best shown in FIG. 8, the frame assembly 100 further comprises at least one, and preferably a pair, of horizontally disposed angled IBU routing hubs 140. As will be described more fully hereinafter, the angled IBU routing hubs 140 transition optical fiber, and particularly jumpers, between the connector modules 80 and the IBU 120. The angled IBU routing hubs 140 are positioned adjacent the base 102 of the distribution frame 50 with their longitudinal axes angled forwardly relative to the lateral direction. The angled IBU routing hubs 140 are suspended above the base 102 in a suitable manner to permit the jumpers to be routed downwardly from the connector modules 80, around the angled IBU routing hub 140 and upwardly into the IBU 120. As shown, the angled IBU routing hubs 140 are suspended above the base 102 by an angled IBU routing hub support bracket 142 attached to the vertical member 122 of the IBU 120, the inner ends of the hubs 140 and the base 102. The angled IBU routing hubs 140 are positioned and angled in this manner to alleviate jumper pile-up at the inner ends of the angled IBU routing hubs 140 beneath the lowermost horizontal IBU hub 124 as the distribution frame 50 becomes increasingly populated with jumpers. The jumpers naturally migrate towards the outer ends of the angled IBU routing hubs 140 as the number of jumpers increases, thereby alleviating jumper pile-up. A generally U-shaped front trough center radius guide 144 is provided on the base 102 forwardly of the angled IBU routing hubs 140 and the bracket 142 for transitioning optical fiber, and particularly jumpers, between an adjacent distribution frame and the IBU 120. Front trough lateral radius guides 145 (FIG. 8) are also provided on the base 102 beneath the support gussets 112 and support rails 114 for likewise transitioning optical fiber, and particularly jumpers, between an adjacent distribution frame and the IBU 120. Both the center radius guide 144 and the lateral radius guide 145 have a predetermined radius, typically at least about 1.5 inches, to maintain the minimum bend radius of the jumpers that are routed into and out of the IBU 120 from an adjacent distribution frame.

Another exemplary embodiment of a high density fiber optic distribution frame 150 constructed in accordance with the invention is shown in FIGS. 12–15. As shown, the lateral dimension of the distribution frame 150 is about 30 inches, the height dimension is about 84 inches and the depth dimension is about 24 inches. However, the specific directions and dimensions referred to herein are utilized merely for convenience and the orientation and overall size of the distribution frame 150 is not intended to be limited in any manner. The distribution frame 150 provides the capability to support existing fiber optic hardware, commonly referred to in the art as "legacy" fiber optic hardware, in addition to the high density fiber optic connector modules 80 described herein. In particular, the distribution frame 150 is configured to support legacy connector housings 160, such as LGX® connector housings available from American Telephone and Telegraph Corporation (AT&T Corp.) of New York, N.Y. or LDC™ connector housings available from Corning Cable Systems LLC of Hickory, N.C. The distribution frame 150 is substantially similar to the distribution frame 50, except that the IBU 120 is formed in modular sections. In particular, the IBU 120 of the distribution frame 150 is formed in substantially identically sections such that the distribution frame 150 can be configured with both connector module housings 60 according to the invention and legacy connector housings 160. Thus, a communications network administrator can configure the distribution frame 150 to continue to utilize legacy fiber optic hardware, thereby amortizing the cost of additional connector module housings 60. As shown, the lower section 152 of the distribution frame 150 is populated with a single left-hand connector module housing and a single right-hand connector module housing. The remainder of the lower section 152 and the middle section 154 are left empty for future growth of the communications network. The upper section 156 of the distribution frame 150 is populated with 3 legacy connector housings 160 for terminating optical fiber in a conventional manner well known to those skilled in the art. The legacy connector housings 160 form no part of the present invention, and thus, need not be described in greater detail. Typically, the legacy connector housings 160 will have less termination density per unit of volume than the connector module housings 60. Accordingly, the number of optical fiber terminations possible on the distribution frame 150 will be less than the distribution frame 50. Nevertheless, the termination density of the distribution frame 150 will be substantially greater than the termination density of a fiber optic distribution frame configured with only legacy connector housings 160 comprising conventional fiber optic adapters.

Figure 12:
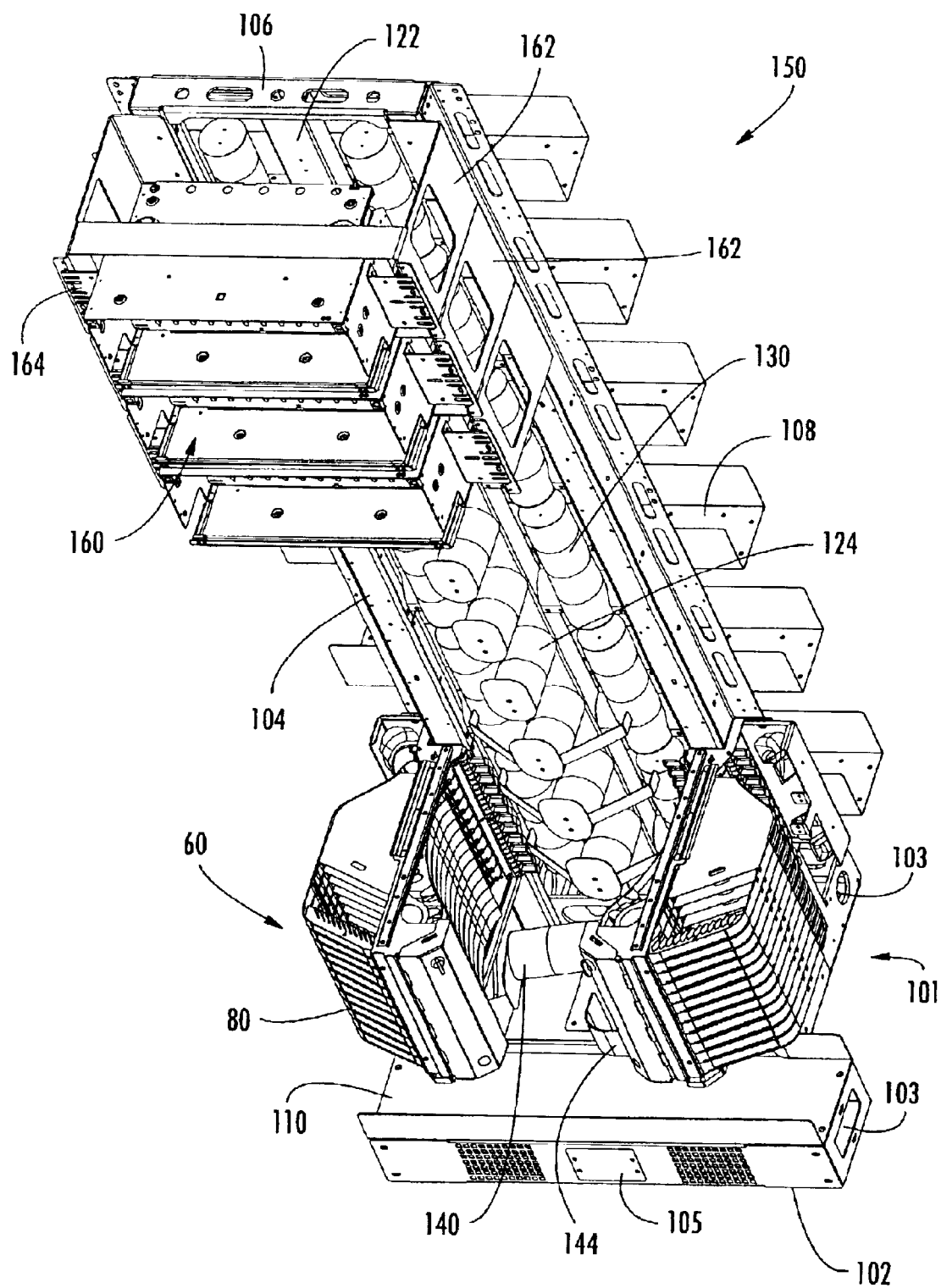
FIG. 12 is a front perspective view of a frame assembly constructed in accordance with another exemplary embodiment of the invention and shown with only the lowermost connector module housings and legacy connector housings installed for purposes of greater clarity.
Figure 14:
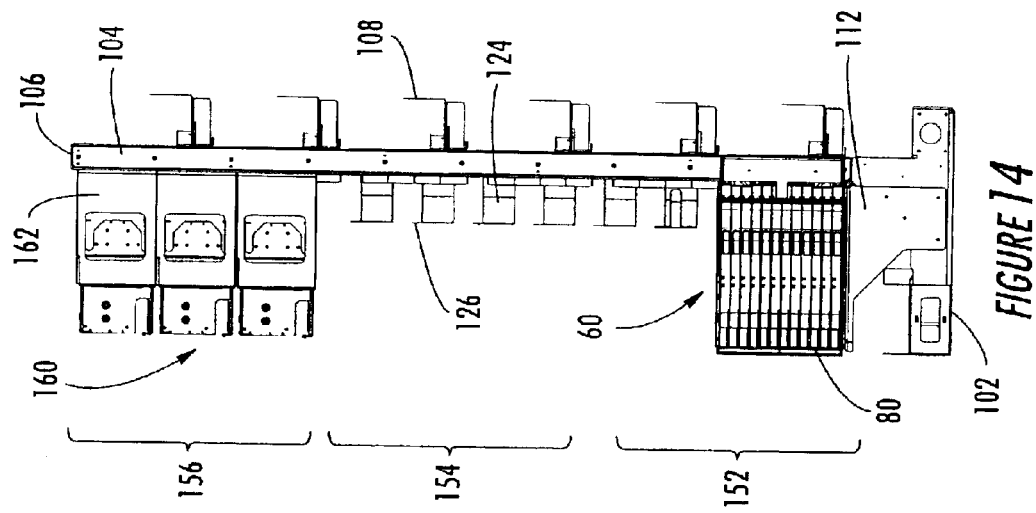
Figure 13:
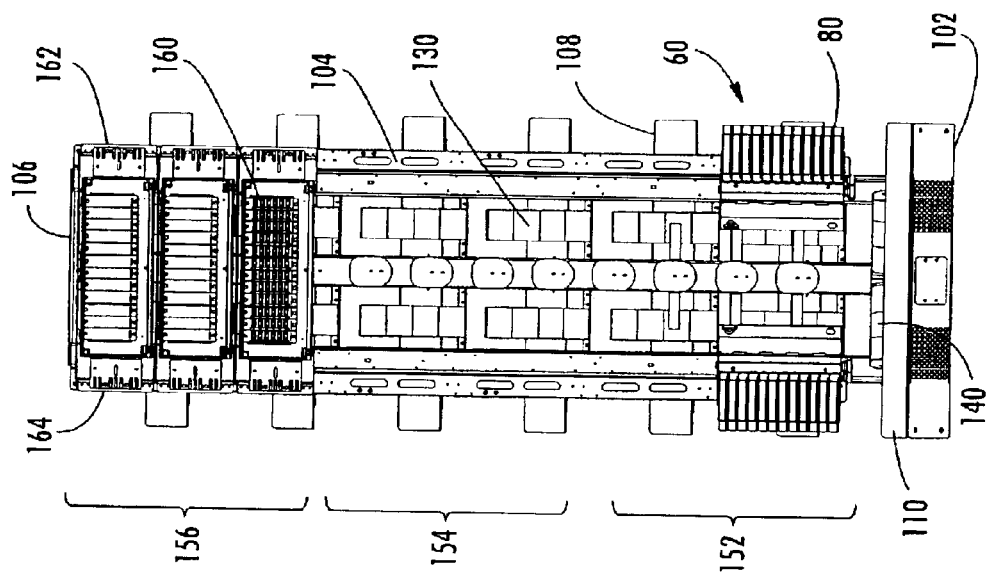
FIG. 13 is a front elevation view of the frame assembly shown in FIG. 12.
Figure 15:
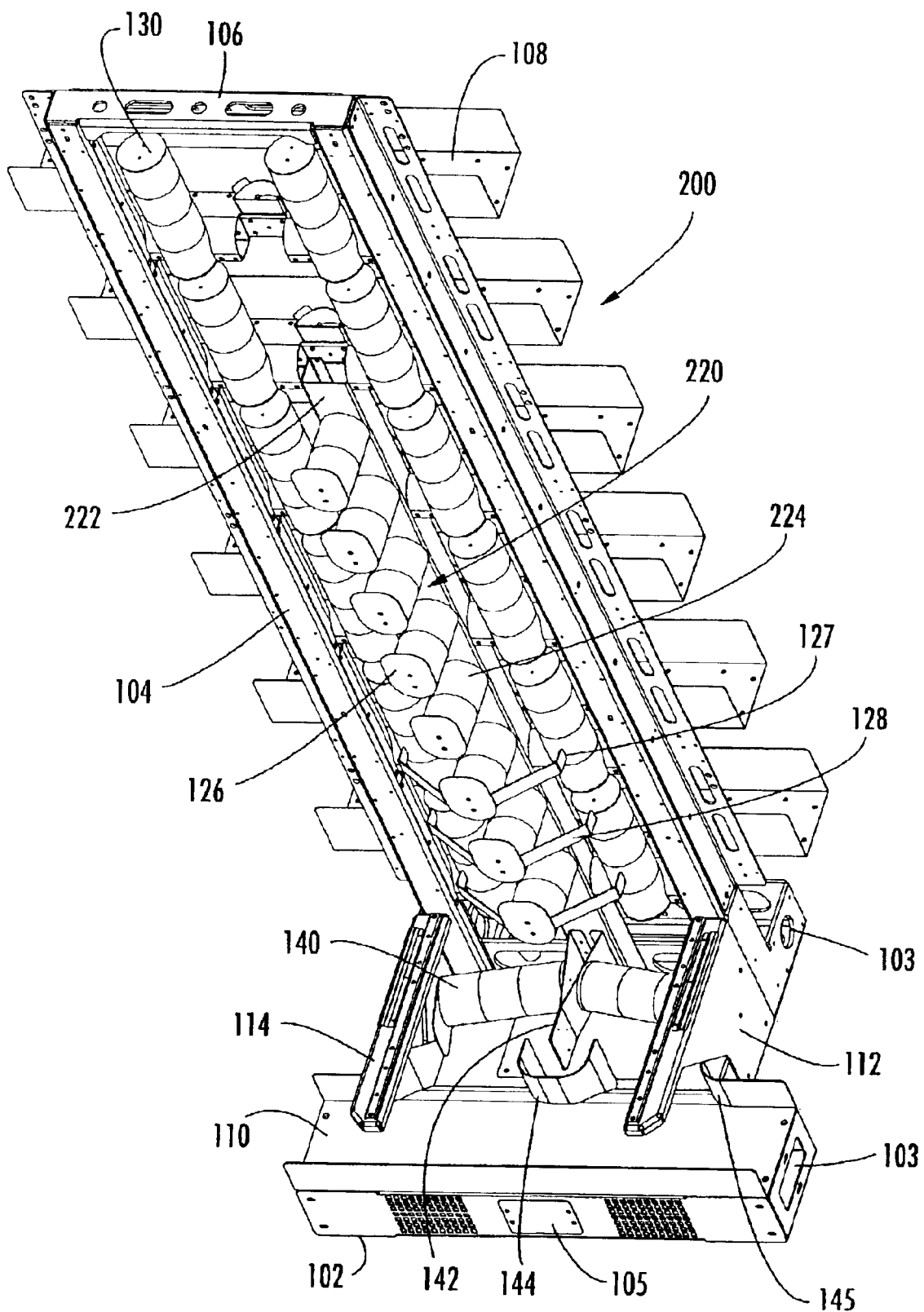
FIG. 15 is a front perspective view of the frame assembly of FIG. 12 shown with the connector module housings and the legacy connector housings removed for purposes of greater clarity.
Figure 16:
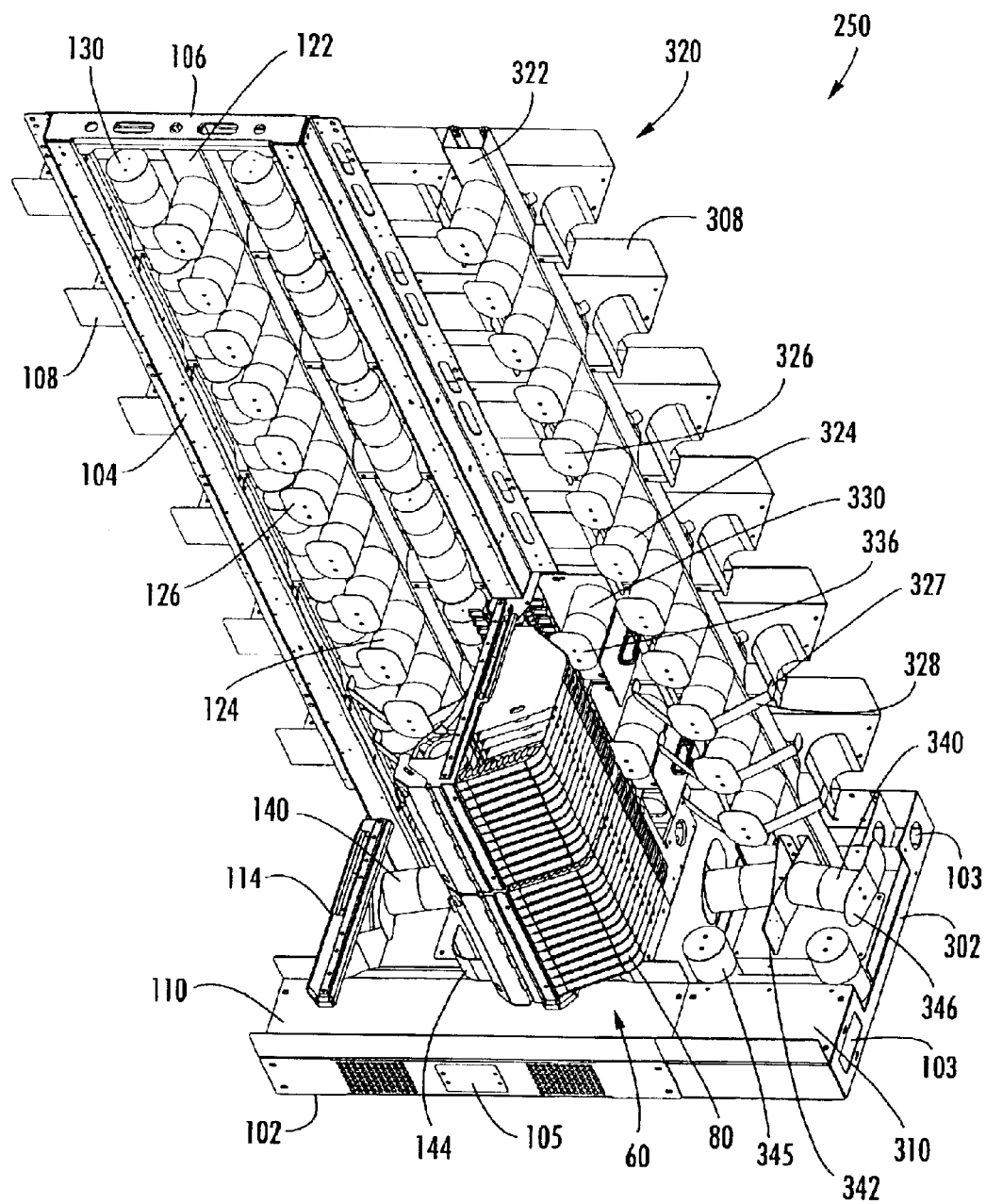
FIG. 16 is a front perspective view of a frame assembly constructed in accordance with yet another exemplary embodiment of the invention and shown with only the lowermost right-hand connector module housings installed for purposes of greater clarity.
Figure 17:
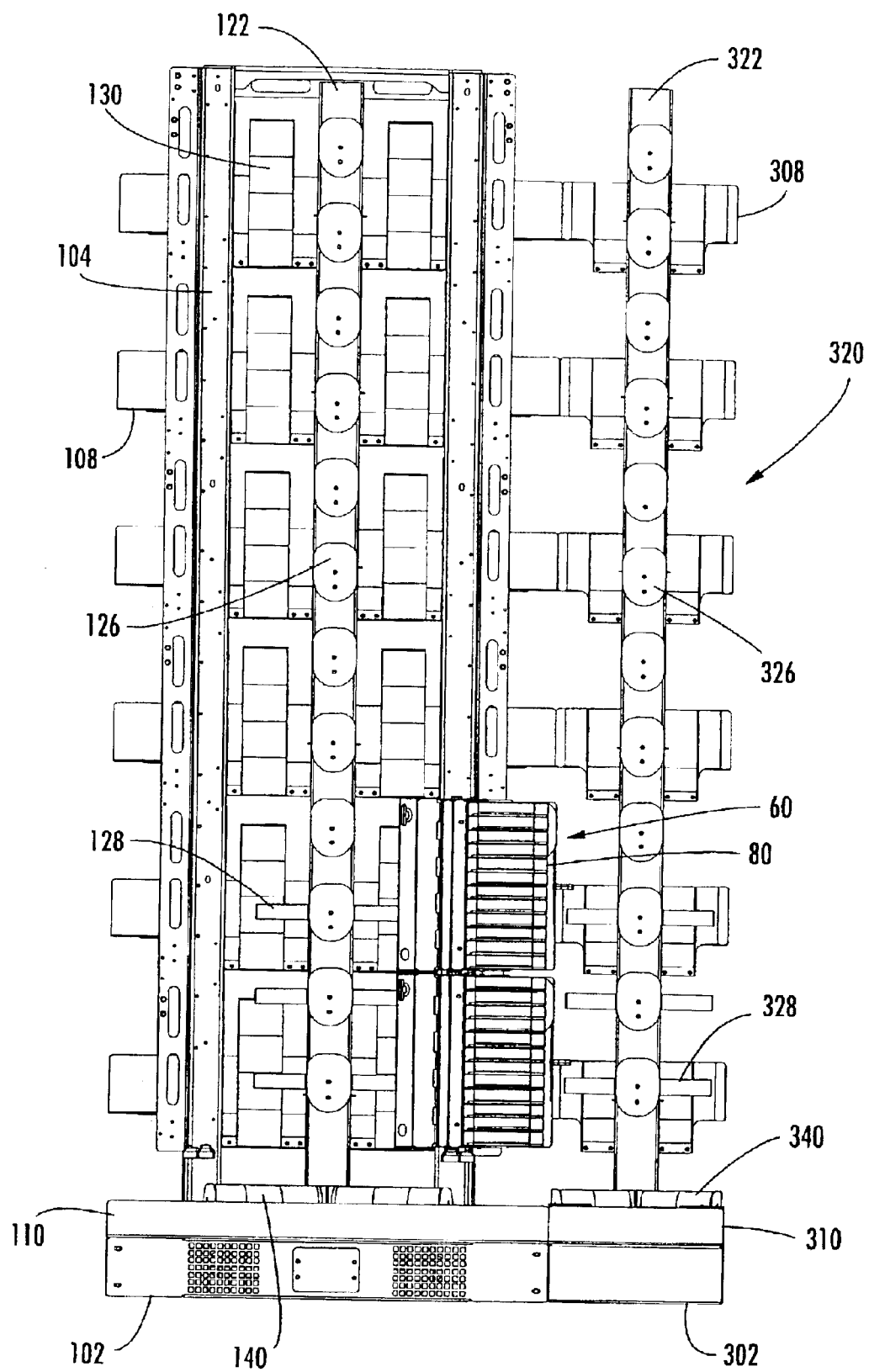
FIG. 17 is a front elevation view of the frame assembly shown in FIG. 16.
Figure 18:
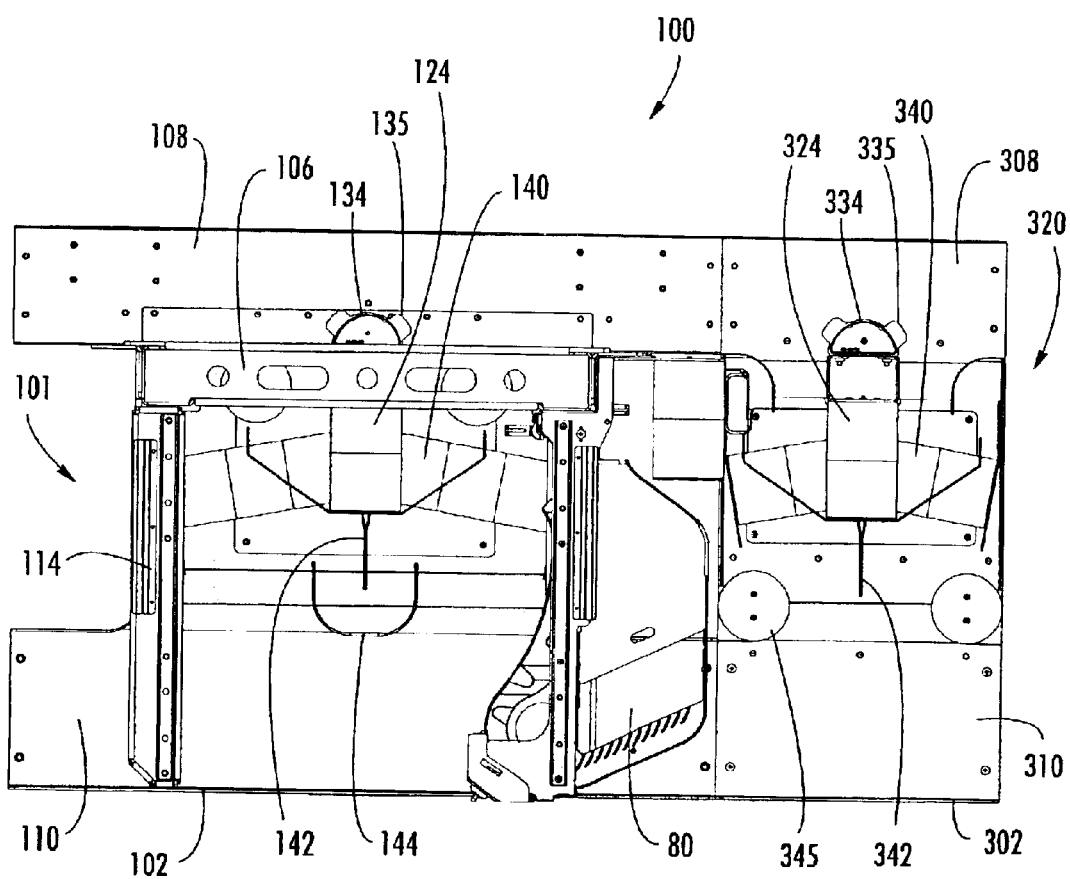
FIG. 18 is a top plan view of the frame assembly shown in FIG. 16.
Figure 20:
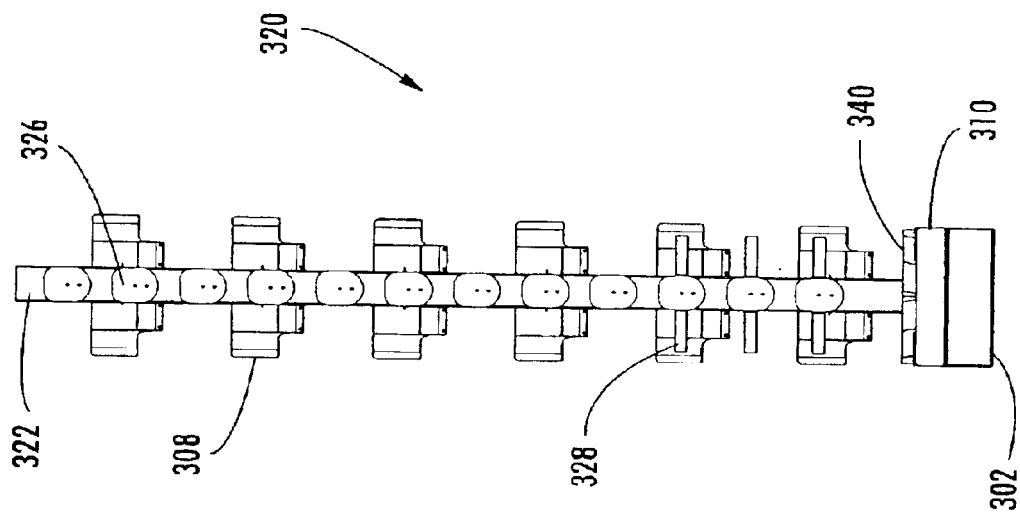
FIG. 20 is a front elevation view of the IFM shown in FIG. 19.
Figure 19:
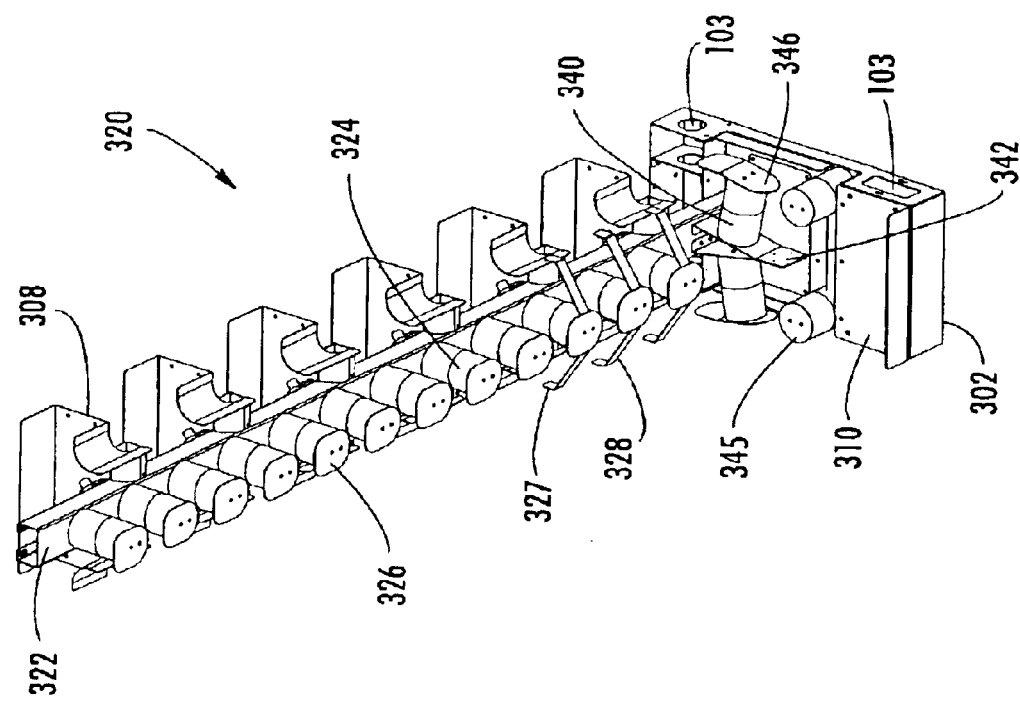
FIG. 19 is a front perspective view of an Interbay Fiber Manager (IFM) constructed in accordance with an exemplary embodiment of the invention.
Figure 22:
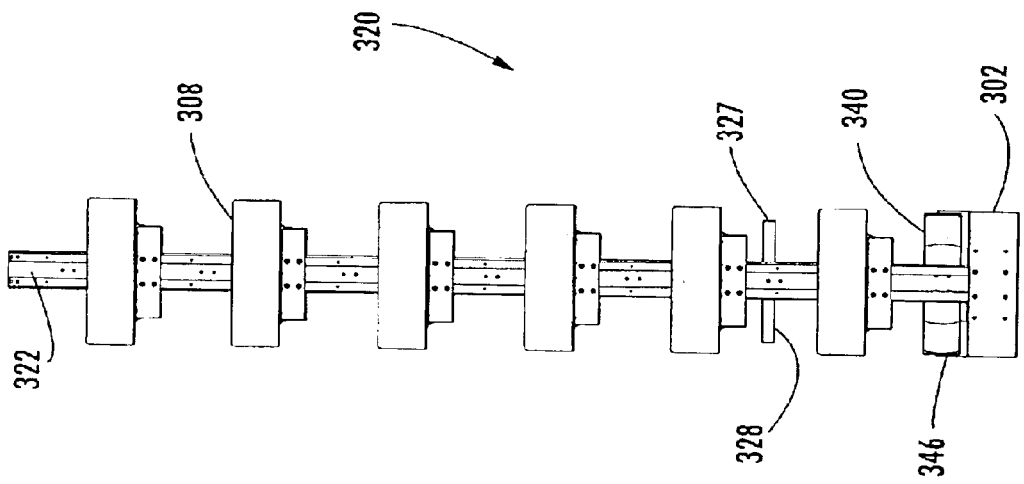
FIG. 22 is a rear elevation view of the IFM shown in FIG. 19.
Figure 21:
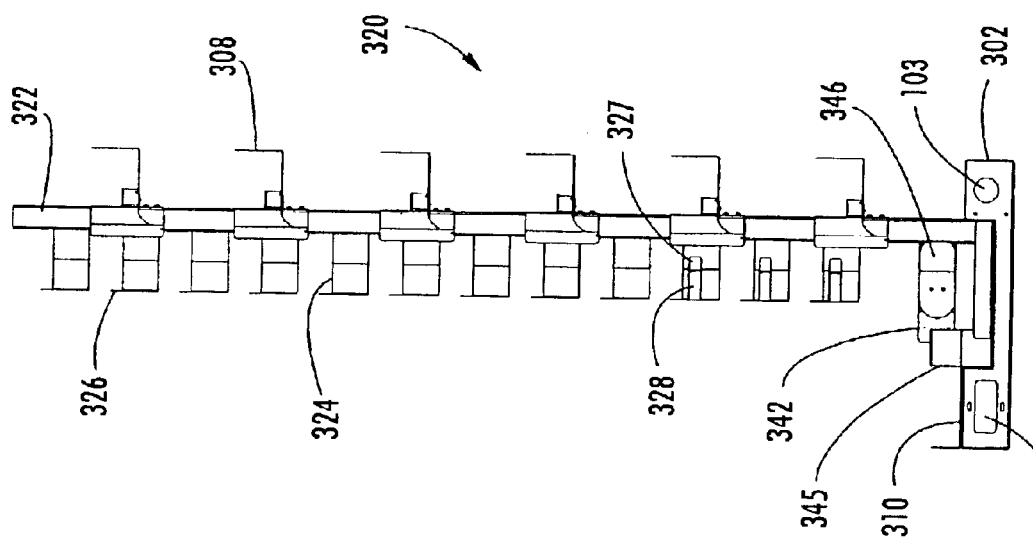
Figure 23:
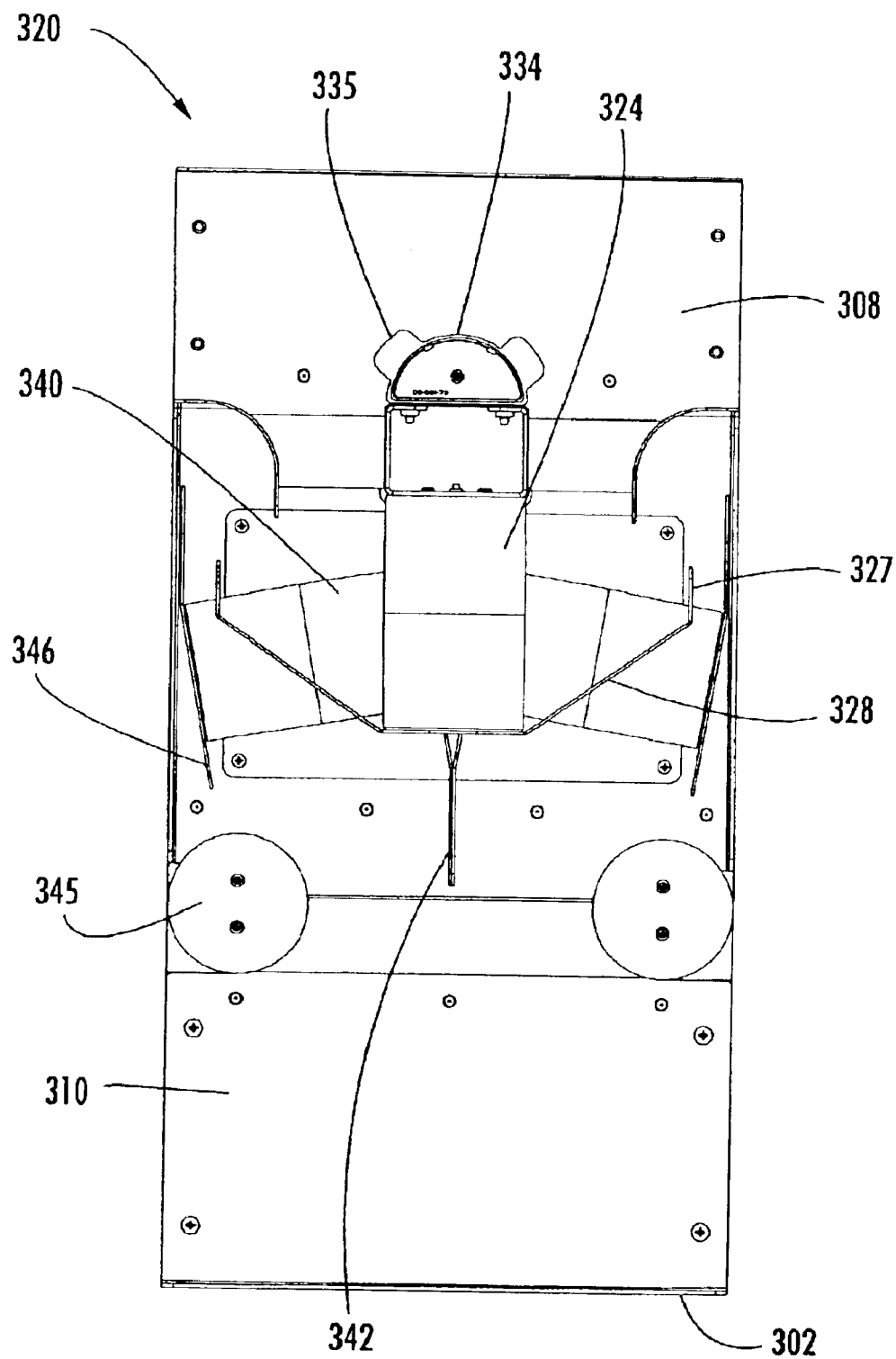
FIG. 23 is a top plan view of the IFM shown in FIG. 19.
Figure 24:
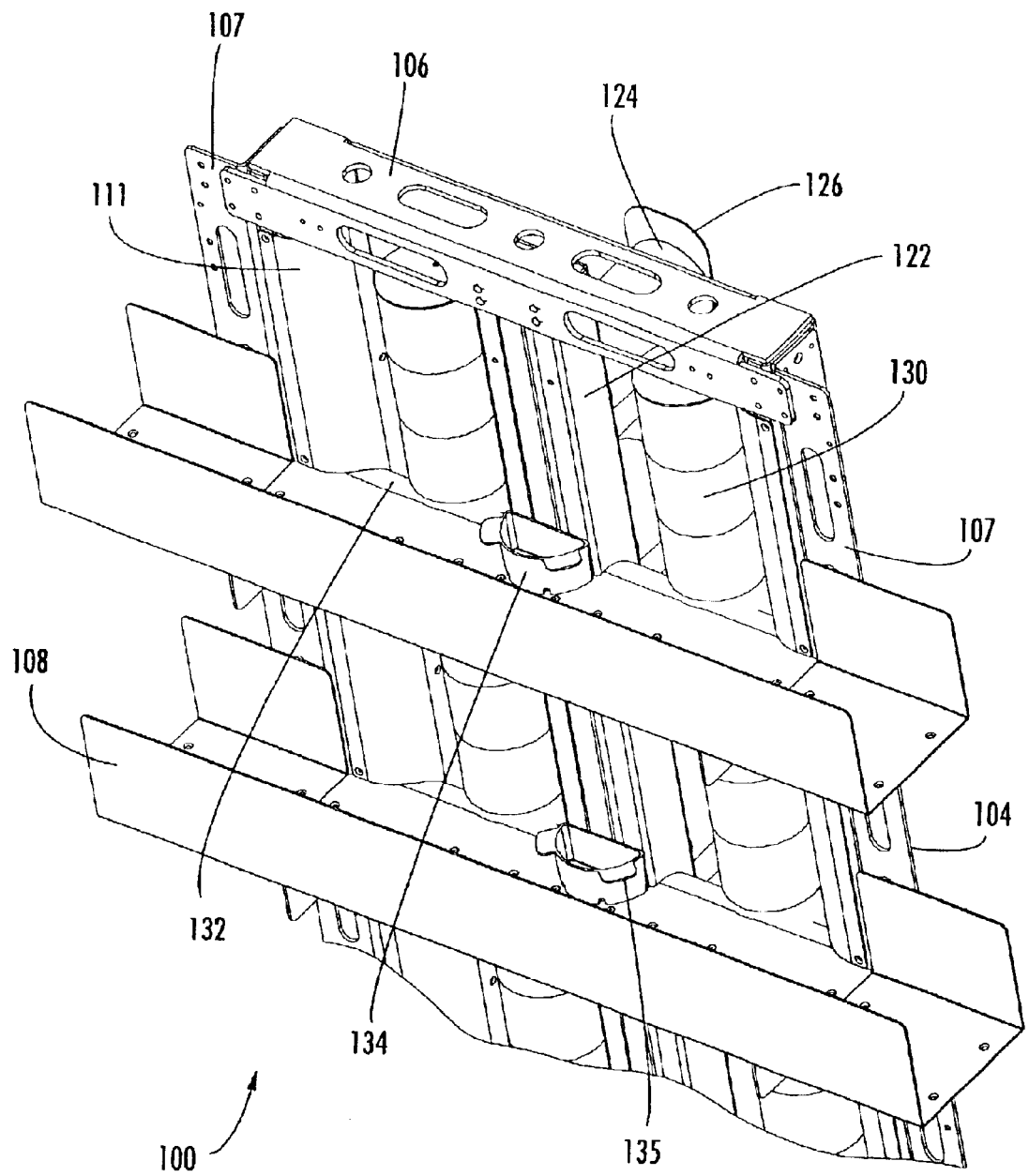
FIG. 24 is an enlarged rear perspective view of the upper portion of the frame assembly of FIG. 1 shown with the connector module housings removed for purposes of greater clarity.
Figure 25:
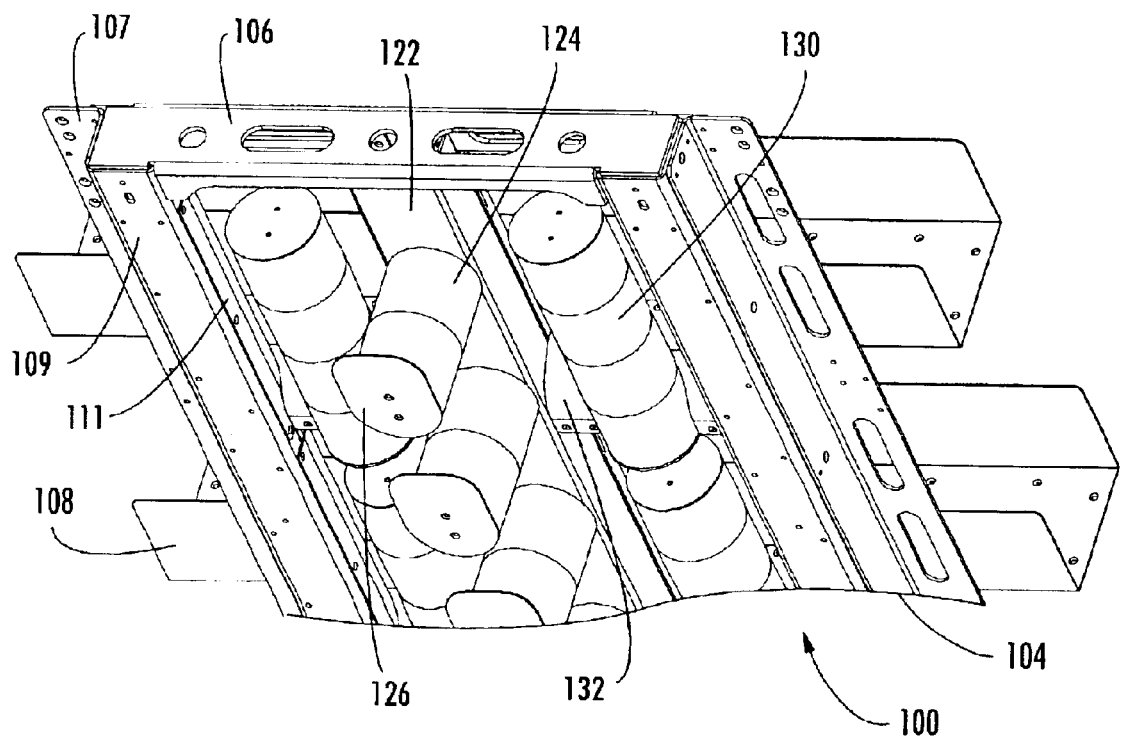
FIG. 25 is an enlarged front perspective view of the upper portion of the frame shown in FIG. 24.
Figure 26:
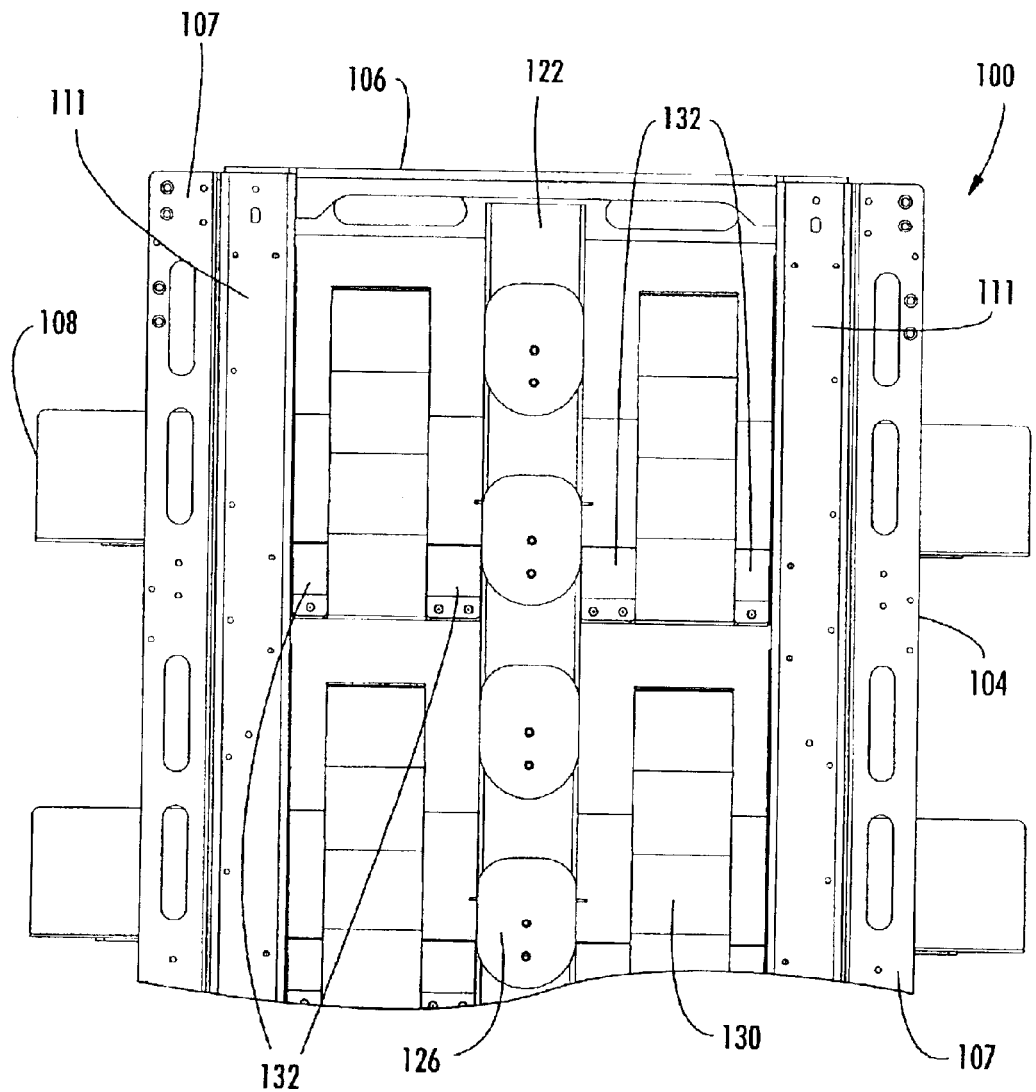
FIG. 26 is an enlarged front elevation view of the upper portion of the frame assembly shown in FIG. 24.

As shown in FIG. 12, the distribution frame 150 may be constructed using the frame assembly 100 previously described. Alternatively, the distribution frame 150 may be constructed utilizing the frame assembly 200 shown in FIG. 15. The frame assembly 200 is substantially identical to the frame assembly 100 with the exception that the vertical member 222 of the IBU 220 terminates between the middle section 154 and below the upper section 156. Accordingly, the horizontal IBU hubs 224 extend only from the base 102 to the top of the middle section 154 of the distribution frame 150. The vertical member 222 and the horizontal IBU hubs 224 do not extend into the upper section 156 of the distribution frame 150. The legacy connector housings 160 typically are designed to mount to the front of a "rack" type distribution frame, and thus, will not be configured to mount directly onto the distribution frame 150. Accordingly, it will be necessary to provide standoff brackets 162 and/or mounting brackets 164 to secure each legacy connector housing 160 to the distribution frame 150. The standoff brackets 162 and mounting brackets 164 shown in FIGS. 12–15 are merely representative and not intended to limit the scope of the invention in any manner. Any suitable means for securing the legacy connector housings 160 to the distribution frame 150 may be utilized without departing form the intended scope of the invention. As shown, standoff bracket 162 is mounted to the left-hand and right-hand uprights 104, respectively, and reversible mounting brackets 164 are secured between the standoff brackets 162 and each legacy connector housing 160. Preferably, the legacy connector housings 160 are further secured to one another to increase the strength and stiffness of the distribution frame 150 as necessary to satisfy industry and governmental seismic requirements.

Another embodiment of a high density fiber optic distribution frame 250 constructed in accordance with the invention is shown in FIGS. 1–23. As shown, the lateral dimension of the distribution frame 250 is about 42 inches, the height dimension is about 84 inches and the depth dimension is about 24 inches. However, the specific directions and dimensions referred to herein are utilized merely for convenience and the orientation and overall size of the distribution frame 250 is not intended to be limited in any manner. The distribution frame 250 provides the capability to support lengths of optical fiber, and in particular fiber optic jumpers, adjacent the connector module housings 60 and apart from the IBU 120. The distribution frame 250 may store additional jumpers that are routed between connector modules 80 mounted on the distribution frame 250, or may store jumpers that are routed between one or more connector modules 80 of the distribution frame 250 and one or more connector modules on an adjacent distribution frame. Regardless, the distribution frame 250 comprises an Interbay Fiber Manager (IFM) 320 that is positioned adjacent and attached to the front trough 110 and one or more of the rear troughs 108 of the frame assembly 100. As shown, the distribution frame 250 is configured with 2 right-hand connector module housings 60 and the IFM 320 mounted on the frame assembly 100. The IFM 320 is similar to the IBU 120 in that it comprises a vertical member 322 and a plurality of horizontal IFM hubs 324 extending outwardly from the vertical member 322. Each of the horizontal IFM hubs 324 has a hub cap 326 attached to the free end thereof. Furthermore, one or more of the horizontal IFM hubs 324 is provided with laterally extending retaining fingers 328 that terminate in end portions 327 that are generally parallel to the longitudinal axis of the horizontal IFM hub 324. Each of the horizontal IFM hubs 324 has a predetermined radius, at least along its upper surface to maintain the minimum bend radius of the jumpers that are routed over the horizontal IFM hub 324. Preferably, the horizontal IFM hubs 324 are cylindrical and have a radius of at least about 1.5 inches.

In addition, the IFM 320 comprises a base 302, a plurality of rear trough extensions 308 adjacent to and in communication with the rear troughs 108 of frame assembly 100, and a front trough extension 310 adjacent to and in communication with the front trough 110 of frame assembly 100. The rear trough extensions 308 permit lengths of optical fiber, and in particular fiber optic jumpers, to be routed between the connector modules 80 and the IFM 320, or between the distribution frame 250 and an adjacent distribution frame. The front trough extension 310 permits optical fiber, and in particular fiber optic jumpers to be routed between the connector modules 80 and the IFM 320, between the IBU 120 and the IFM 320, or between the distribution frame 250 and an adjacent distribution frame. In the particular embodiment shown herein, one or more horizontal jumper routing hubs 330 are positioned on the distribution frame 250 between the connector module housings 60 and the IFM 320. The horizontal jumper routing hubs 330 transition jumpers directly between the connector modules 80 and the IFM 320. The outer ends of the horizontal jumper routing hubs 330 are preferably provided with hub caps 336 similar to the hub caps 126 previously described. Each of the horizontal jumper routing hubs 330 has a predetermined radius, at least along its upper surface to maintain the minimum bend radius of the jumpers that are routed over the horizontal jumper routing hub 330. Preferably, the horizontal jumper routing hubs 330 are cylindrical and have a radius of at least about 1.5 inches.

The IFM 320 further comprises at least one, and preferably a pair of horizontally disposed angled IFM routing hubs 340 for transitioning optical fiber, and in particular fiber optic jumpers, between the IBU 120 and the IFM 320. The angled IFM routing hubs 340 are substantially similar to the angled IBU routing hubs 140 previously described except the angled IFM routing hubs 340 may be shorter in length and angled more to accommodate the more narrow width of the base 302 of the IFM 320. The angled IFM routing hubs 340 are suspended above the base 302 of the IFM 320 and the longitudinal axes of the angled IFM routing hubs 340 are angled forwardly relative to the lateral direction. The angled IFM routing hubs 340 are suspended above the base 302 to permit the jumpers to be routed downwardly from the connector modules 80 and around the horizontal jumper routing hubs 330, around the angled IFM routing hub 340 and upwardly into the IFM 320. As shown, the angled IFM routing hubs 340 are suspended above the base 302 by an angled IFM routing hub support bracket 342 attached to the vertical member 322 of the IFM 320, the inner ends of the IFM routing hubs 340 and the base 302. The outer ends of the IFM routing hubs 340 are preferably provided with hub caps 346 similar to the hub caps 126 previously described. The angled IFM routing hubs 340 are positioned and angled in this manner to alleviate jumper pile-up at the inner ends of the angled IFM routing hubs 340 beneath the lowermost horizontal IFM hub 324 as the IFM 320 of the distribution frame 250 becomes increasingly populated with jumpers. The jumpers naturally migrate towards the outer ends of the angled IFM routing hubs 340 as the number of jumpers increases, thereby alleviating jumper pile-up. At least one, and preferably a pair of front trough extension lateral radius guides 345 are provided on the base 302 forwardly of the angled IFM routing hubs 340 and the bracket 342 for transitioning optical fiber, and particularly jumpers, between the front trough 110 of the frame assembly 100 and the IFM 320, or between the IFM 320 and an adjacent distribution frame in the communications network. The angled IFM routing hubs 340 and the lateral radius guides 345 each have a predetermined radius, typically at least about 1.5 inches, to maintain the minimum bend radius of the jumpers that are routed into and out of the IFM 320.

FIGS. 24–29 illustrate the integral radius control features provided on the frame assembly 100 of the distribution frame 50, 150, 250. The integral radius control features operate in conjunction with the horizontal IBU hubs 124, the vertical IBU routing hubs 130, the angled IBU routing hubs 140, the front trough central radius guide 144, the front trough lateral radius guides 145, the horizontal IFM hubs 324, the horizontal jumper routing hubs 330, the angled IFM routing hubs 340 and the front trough extension lateral radius guides 345 previously described to maintain the minimum bend radius of the optical fiber routed, stored and terminated on the distribution frame 50, 150, 250. Optical fiber, and particularly fiber optic jumpers, exiting the connector modules housings 60, as will be described hereinafter, and exiting the legacy connector housings 160 is transitioned onto the rear troughs 108 by transition radius guides 132 attached to the cross members 106 adjacent the rear troughs 108. The transition radius guides 132 extend laterally between the uprights 104 and the vertical IBU routing hubs 130 and between the vertical IBU routing hubs 130 and the vertical member 122 of the IBU 120. A rear trough radius guide 134 maintains the minimum bend radius of jumpers that transition across the rear troughs 108 between, for example, a connector module 80 mounted on a left-hand connector module housing and a connector module 80 mounted on a right-hand connector module housing. In particular, the rear trough radius guides 134 protect the jumpers against the sharp bend angle that would be encountered when the jumper passes around the vertical member 122 of the IBU 120 on the rear of the distribution frame 50, 150, 250. As shown, each rear trough radius guide 134 is provided with a pair of retaining flanges 135 for retaining the jumpers on the rear trough radius guide 134. It should be noted that the IFM 320 is provided with a corresponding rear rough extension radius guide 334 having retaining flanges 335 (FIG. 23) for maintaining the minimum bend radius of jumpers transitioning between the frame assembly 100 and the IFM 320 or between the IFM 320 and an adjacent distribution frame 50, 150, 250 of the communications network.

Figure 29:
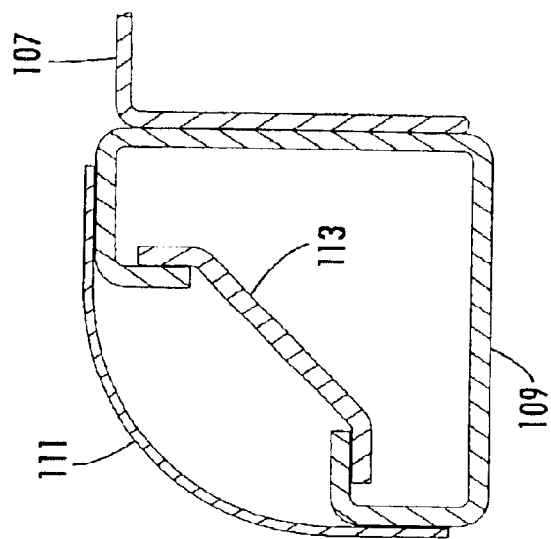
FIG. 29 is an enlarged sectional view of yet another exemplary embodiment of an upright constructed in accordance with the invention.
Figure 28:
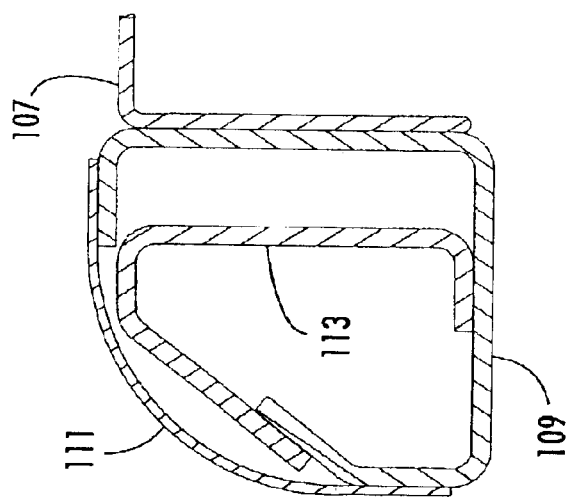
FIG. 28 is an enlarged sectional view of another exemplary embodiment of an upright constructed in accordance with the invention.
Figure 27:
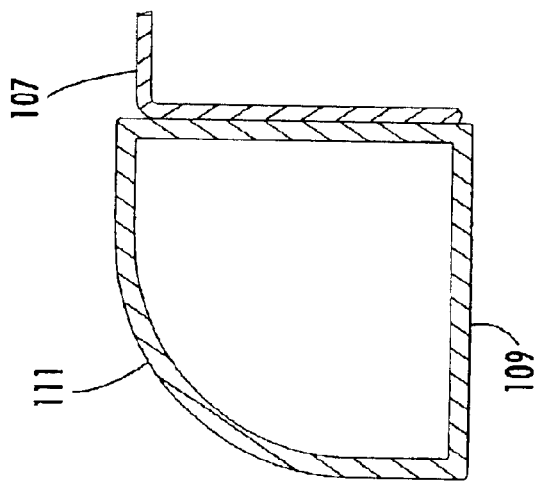
FIG. 27 is an enlarged sectional view of an exemplary embodiment of an upright constructed in accordance with the invention.
Figure 30:
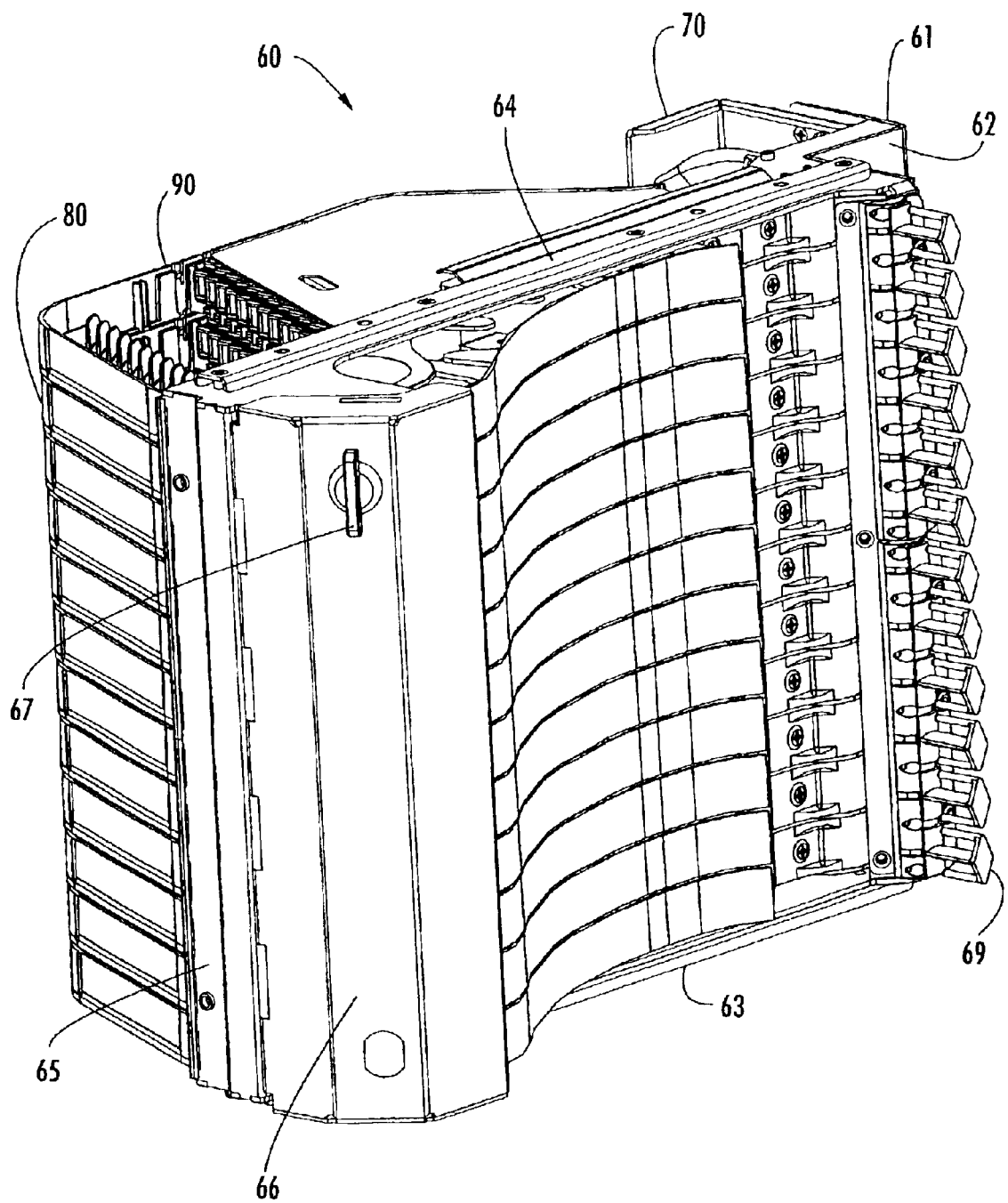
FIG. 30 is a right front perspective view of an exemplary embodiment of a left-hand connector module housing constructed in accordance with the invention with the connector modules removed for purposes of greater clarity.
Figure 31:
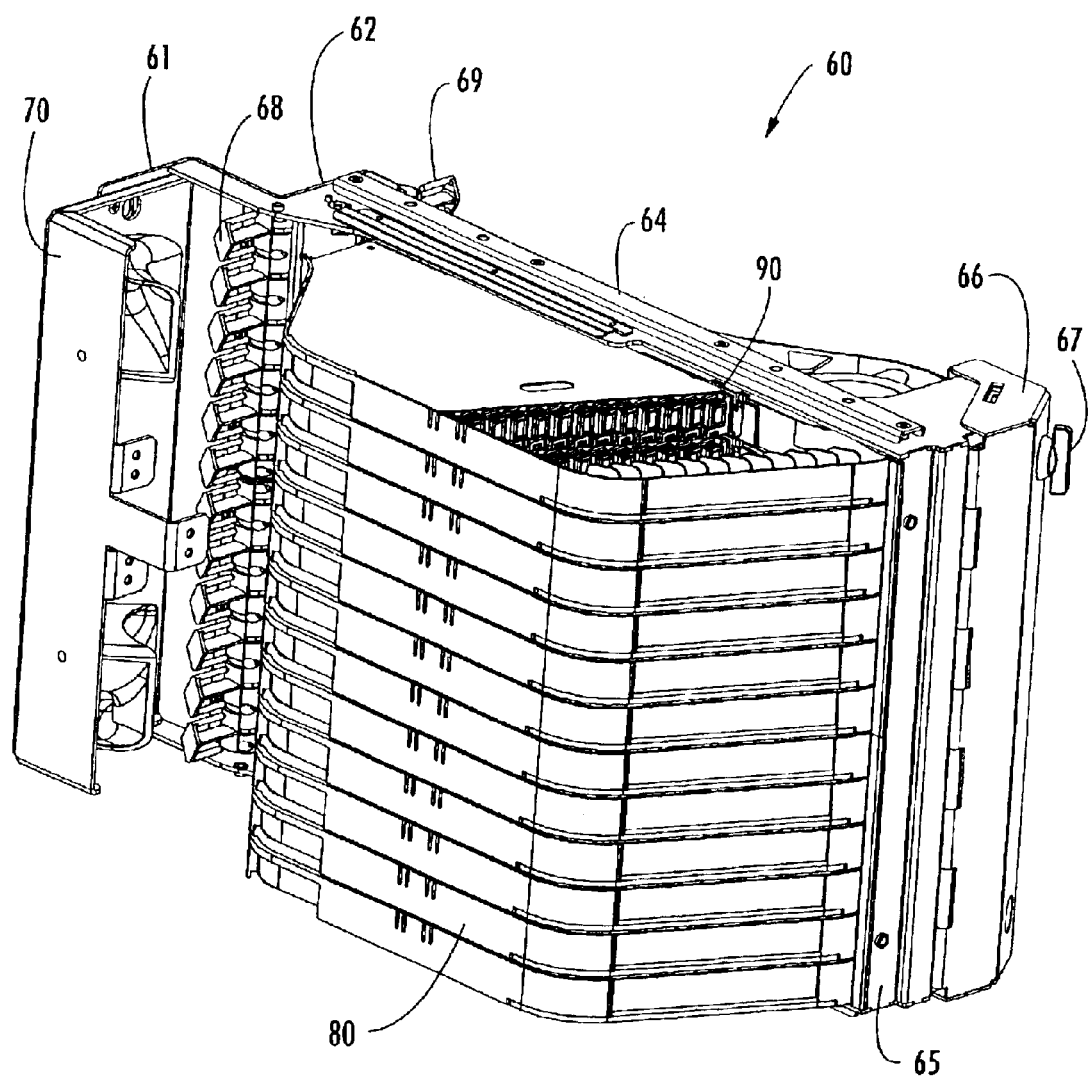
FIG. 31 is a left front perspective view of the connector module housing shown in FIG. 30.

The uprights 104 are likewise configured to maintain the minimum bend radius of the jumpers routed stored and terminated on the distribution frame 50, 150, 250. FIGS. 27–29 show the cross sections of alternative constructions for providing sufficient strength and stiffness to comply with industry and governmental seismic requirements, while maintaining the minimum bend radius of the jumpers. Each upright 104 comprises a generally L-shaped external mounting bracket 107 having a plurality of threaded holes. The mounting bracket 107 operates as one of the mounting surfaces for mounting the connector module housings 60 on the frame assembly 100, as will be described hereinafter. Each upright 104 further comprises a body having a generally L-shaped outer portion 109 and a curved inner portion 111 having a radius at least equal to the minimum bend radius of the jumpers. In the exemplary embodiment illustrated in FIG. 27, the inner portion 111 and the outer portion 109 are formed integrally, for example by longitudinal extrusion of a metal or plastic material. In the exemplary embodiments illustrated in FIGS. 28 and 29, the inner portion 111 is mechanically attached to the outer portion, for example by rivets or screws, or by welding. The uprights 104 in FIGS. 28 and 29 further comprise a center portion 113 for increasing the strength and stiffness of the uprights 104 that is likewise mechanically attached to the outer portion, for example by rivets or screws, or by welding. The inner portion 111 of the uprights maintains the minimum bend radius of jumpers transitioning between, for example, the connector module housings 60 or the legacy connector housings 160 and an adjacent distribution frame of the communications network. It will readily be apparent to those of skill in the art from the description provided herein that the transition radius guide 132, the rear trough radius guide 134, the rear trough extension radius guide 334 and the inner portions 111 of the uprights 104 each have a predetermined radius, typically about 1.5 inches.

Figure 32:
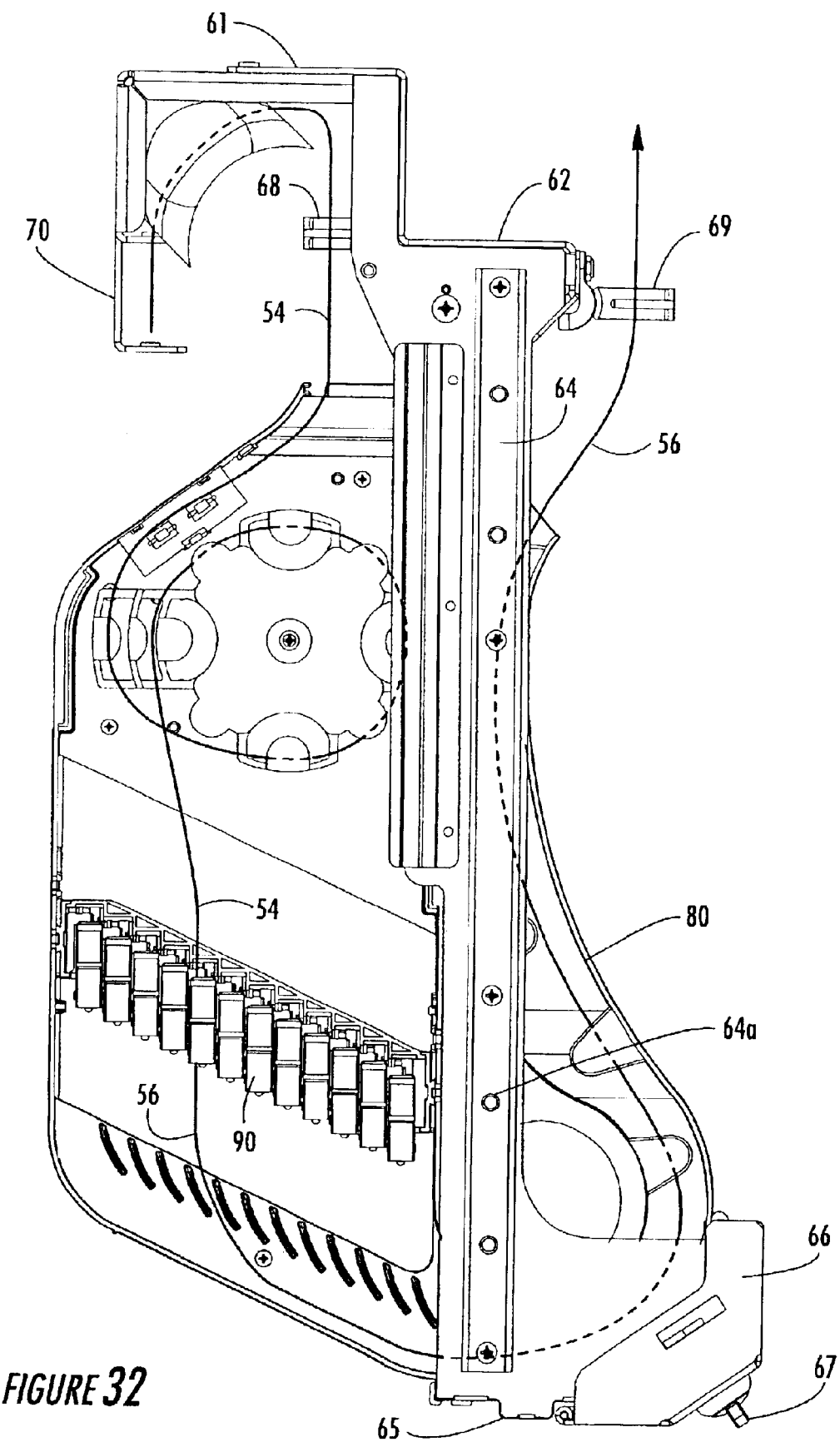
FIG. 32 is a top plan view of the connector module housing shown in FIG. 30 with the cover of the uppermost connector module removed for purposes of greater clarity.
Figure 34:
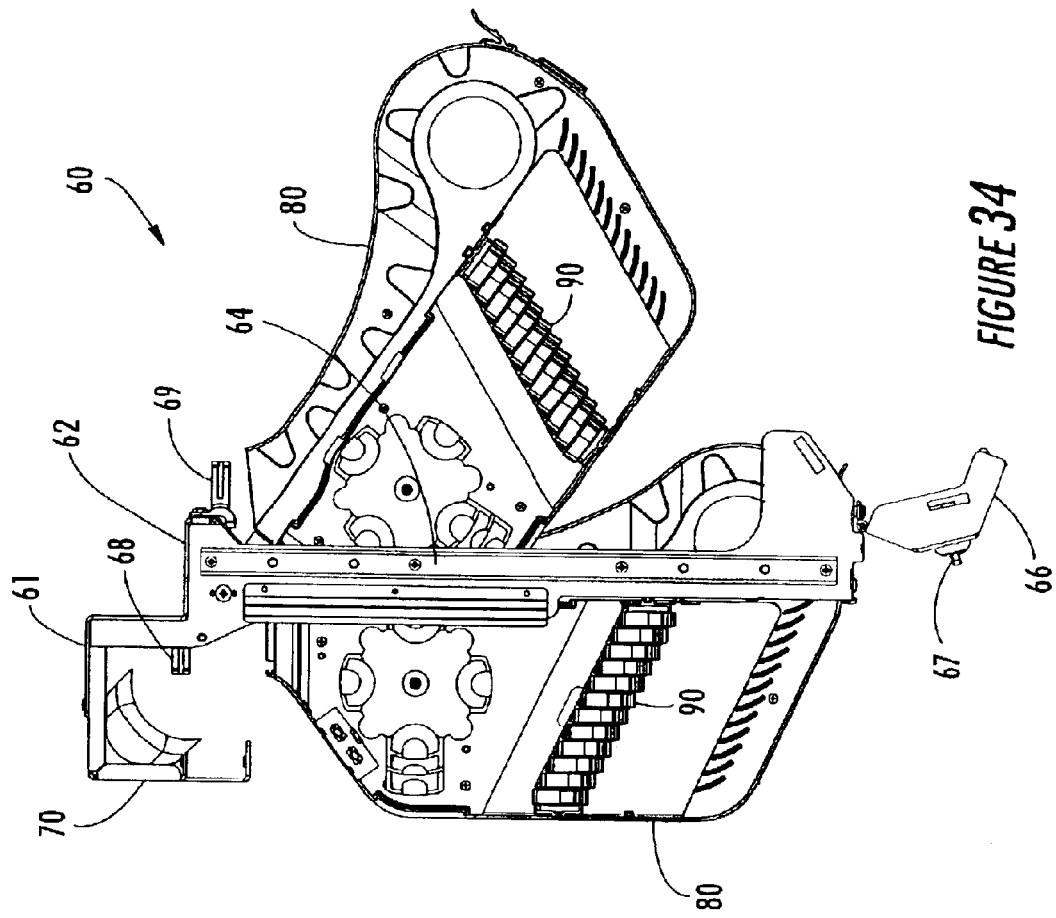
FIG. 34 is a top plan view of the connector module housing shown in FIG. 33.
Figure 37:
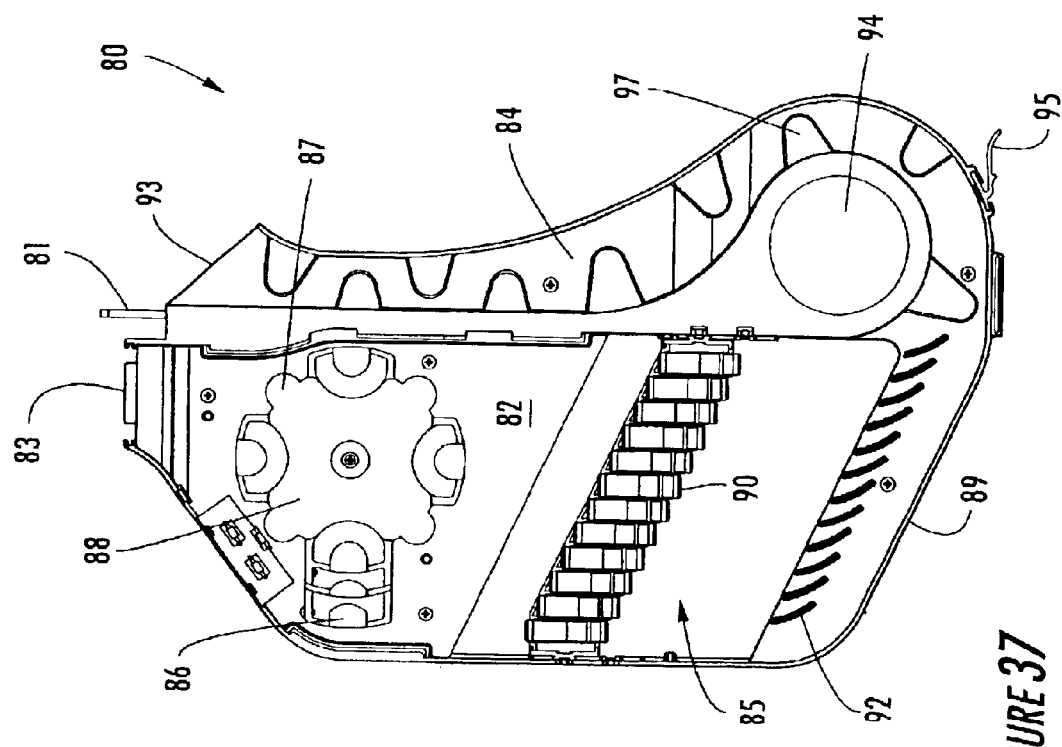
FIG. 37 is a top plan view of the connector module shown in FIG. 35.
Figure 35:
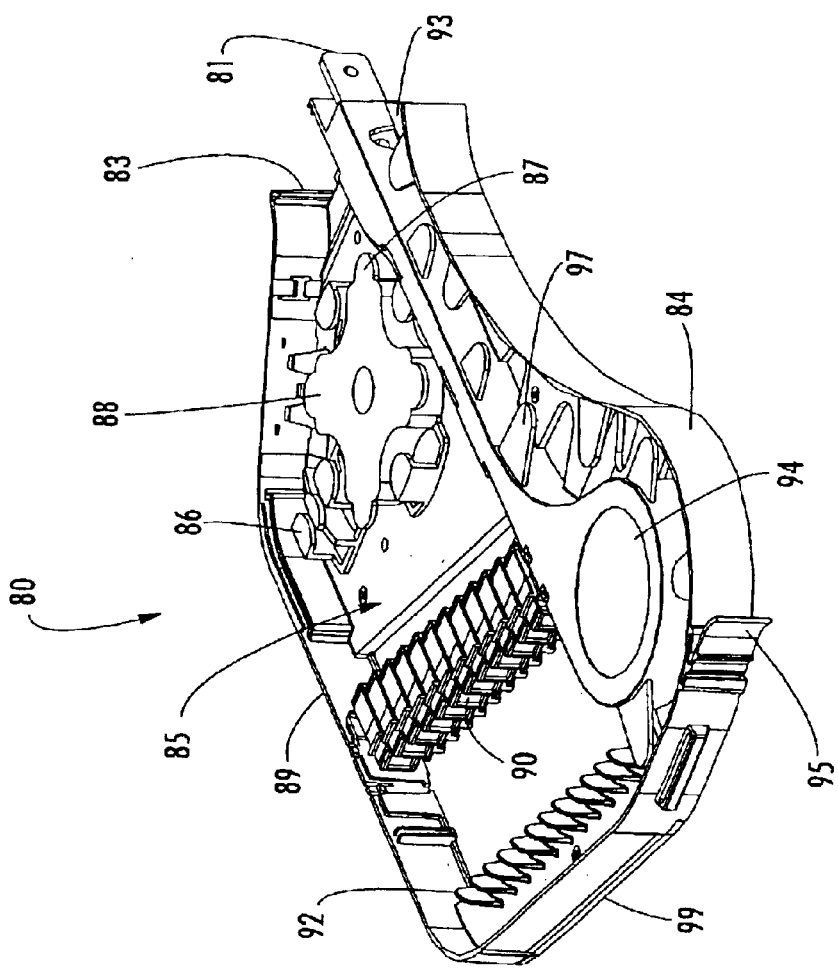
FIG. 35 is a top perspective view of a representative connector module of the connector module housing shown in FIG. 30.
Figure 36:
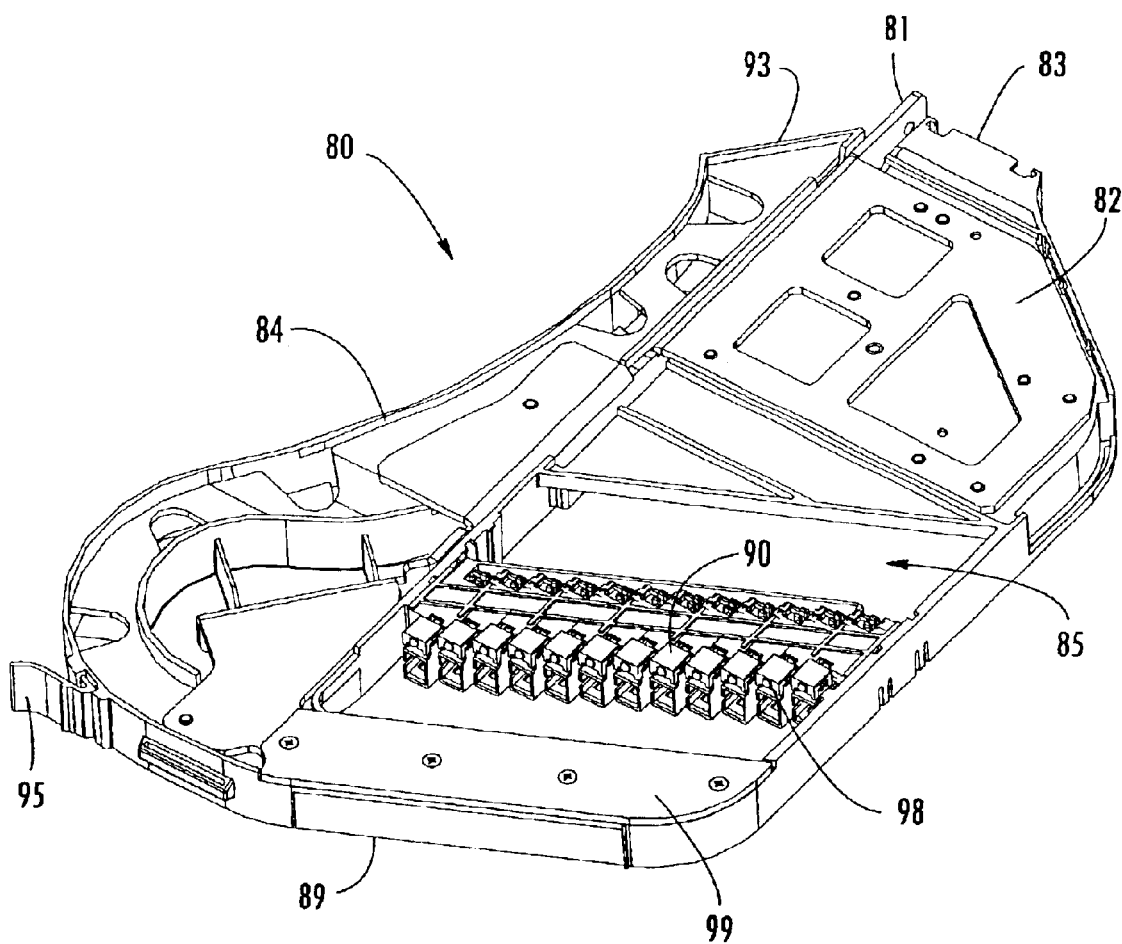
FIG. 36 is a bottom perspective view of the connector module shown in FIG. 35.
Figure 38:
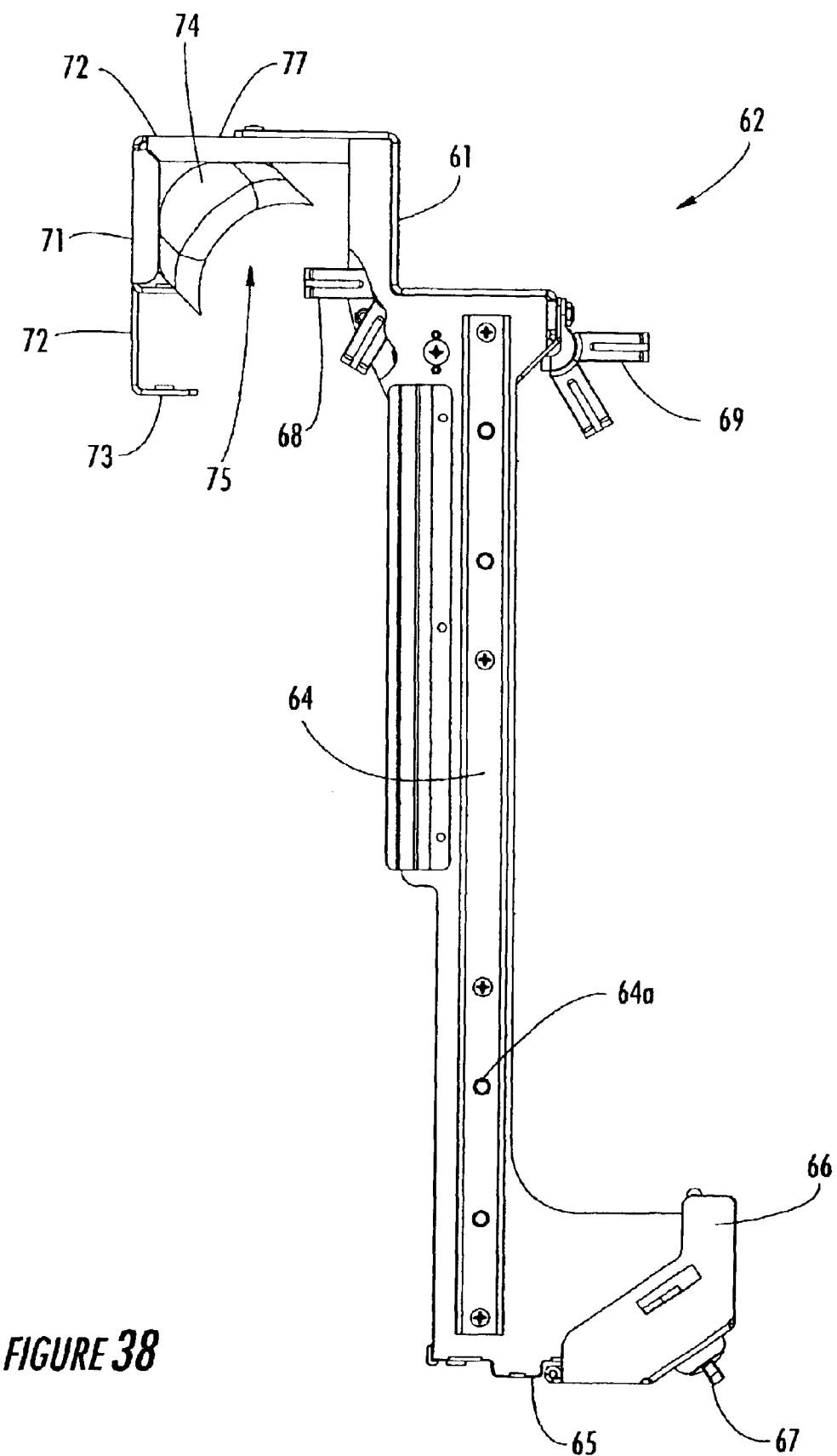
FIG. 38 is a top plan view of the transition box and mounting frame of the connector module housing shown in FIG. 30.
Figure 39:
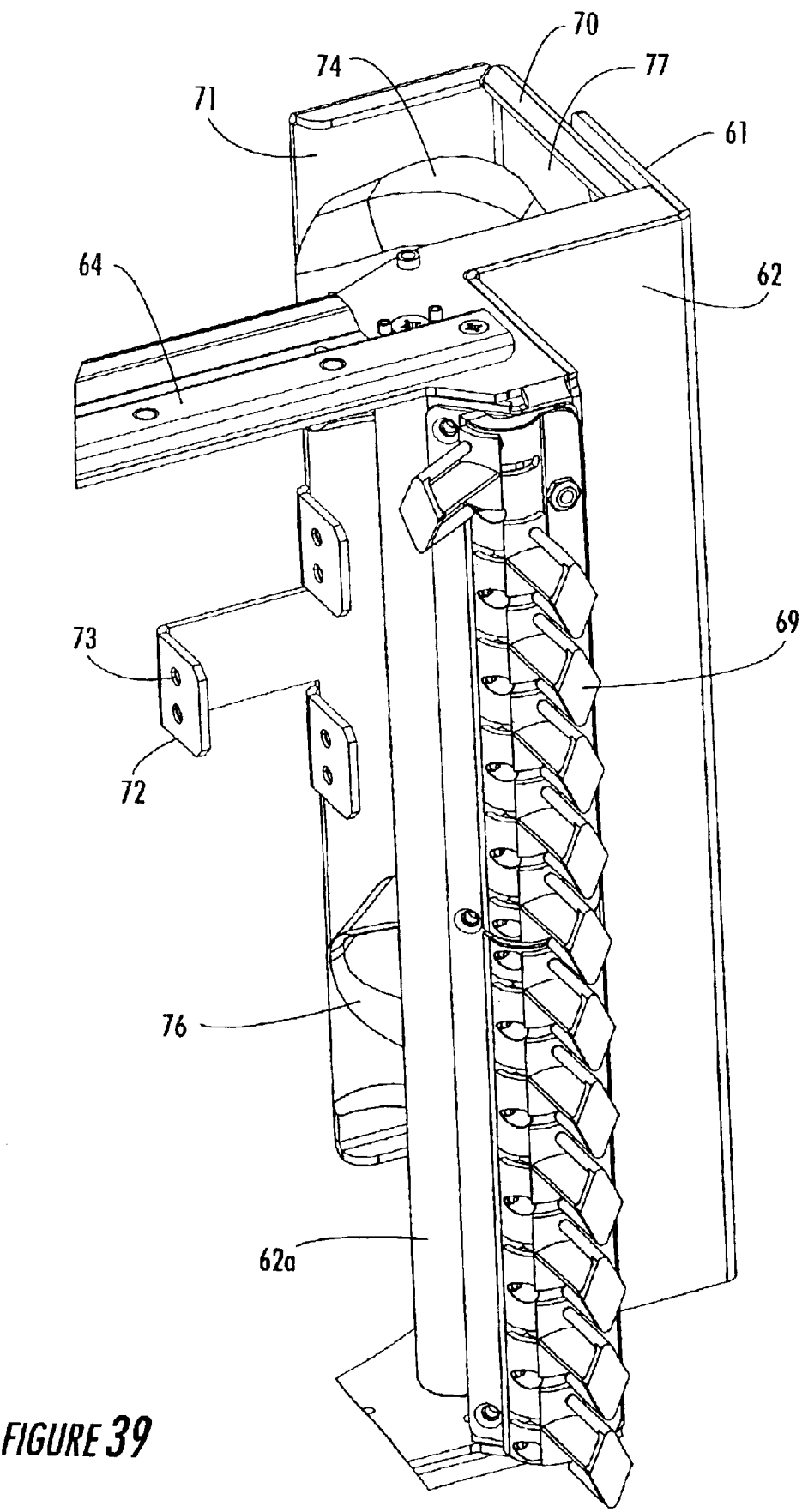
FIG. 39 is a right front perspective view of the transition box and a portion of the mounting frame of the connector module housing shown in FIG. 30.

An exemplary embodiment of a representative connector module housing 60 constructed in accordance with the invention is shown in FIGS. 30–39. An exemplary embodiment of a representative connector module 80 mounted within the connector module housing 60 is shown in FIGS. 35–37. Details of the mounting frame 62 and the transition box 70 of the connector module housing 60 are best shown in FIGS. 38–39. As previously mentioned, the connector module housing 60 shown in greater detail in FIGS. 30–39 is a left-hand connector module housing of the type shown mounted to the distribution frame 50 in FIG. 1 and to distribution frame 150 in FIG. 12. A right-hand connector module housing is shown mounted to the distribution frame 250 in FIG. 16. The left-hand and right-hand connector module housings are mirror images, but otherwise identical. As shown, the connector module housing 60 comprises a mounting frame 62, a transition box 70 and at least one connector module 80 movably mounted on the mounting frame 62 adjacent the transition box 70. The mounting frame 62 is secured to the upright 104 of the frame assembly 100, for example by threaded bolts, and the rearward end 61 of the mounting frame 62 is generally Z-shaped to conform to the outer portion 109 and the external mounting flange 107 of the upright 104. The mounting frame 62 comprises a lower support rail 63 and an upper support rail 64. The lower support rail 63 of the lowermost connector module housings 60 is attached to the connector module support rail 114 along the gusset support 112 previously described (FIG. 8). The upper support rail 64 operates in the same manner as the support rail 114 to attach the lower support rail 63 of a successive connector module housing 60, if present, to the upper support rail 64. In this manner, each connector module housing 60 mounted on the distribution frame 50, 150, 250 is secured to the gusset support 112 or to another connector module housing 60. The support rails 114, 63, 64 may be attached to one another in any suitable manner, for example by engaging threaded bolts in threaded holes 64a (FIGS. 32 and 38). Alternatively, lower support rail 63 may be formed as a rib that is slidingly received in a channel provided on support rail 114 or upper support rail 64. Similarly, support rail 114 and upper support rail 64 may be formed as a rib that is slidingly received in a channel provided on lower support rail 63. Regardless, the support rails 114, 63, 64 increase the strength and stiffness of the distribution frame 50 150, 250 as necessary to satisfy industry and governmental seismic requirements.

Figure 33:
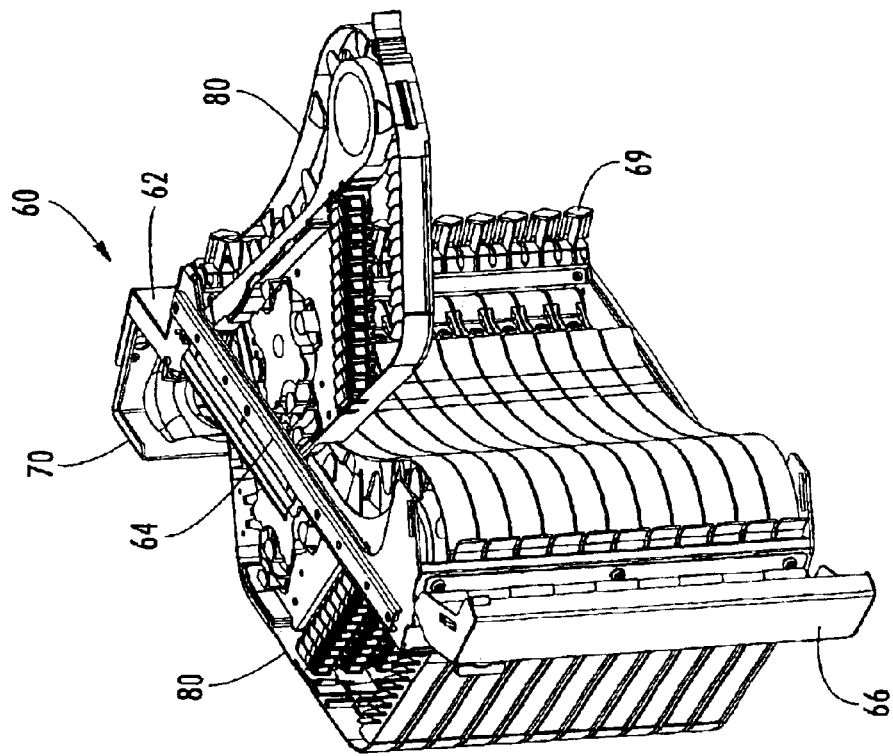
FIG. 33 is a right front perspective view of the connector module housing of FIG. 30 shown with one of the connector modules in the extended position and with the connector module covers removed for purposes of greater clarity.

The mounting frame 62 of the connector module housing 60 further comprises means for movably attaching the connector modules 80 to the mounting frame 62. Preferably, the connector modules 80 are rotatably attached to the mounting frame 62 and are movable between a stowed position, a shown in FIGS. 30–32, and a deployed position, as shown in FIGS. 33 and 34. Each connector module 80 is rotatable relative to the mounting frame 62, and thus, relative to the connector module housing 60, so that the connector module 80 may be moved from the stowed position to the deployed position to access the fiber optic adapters 90 mounted therein. As shown and described herein, the connector module housing 60 are mounted on the distribution frame 50, 150, 250 such that the connector modules 80 rotate inwardly about a vertical axis (i.e., horizontally) from the stowed position to the deployed position in the direction of the IBU 120. This configuration reduces the lateral width of the distribution frame 50, 150, 250 and prevents interference between the connector modules 80 of adjacent distribution frames in the deployed position. However, the connector modules 80 may rotate outwardly from the stowed position to the deployed position, or may rotate about an angled axis without departing from the intended scope of the invention. The connector modules 80 may be rotated between the stowed and deployed positions using any suitable means for permitting rotation relative to the mounting frame 62 of the connector module housing 60. Preferably, however, the connector modules 80 are attached to a vertical shaft 62*a* (FIG. 39) have ends rotatably mounted to the mounting frame 62 adjacent the lower support rail 63 and the upper support rail 64.

The mounting frame 62 further comprises a cover 66 hingedly attached to the forward end 65 of the mounting frame 62. In the closed position, the cover conceals the forward portion of the connector module 80, and in particular, the connector module latch 95 for rotating the connector module 80 between the stowed position and the deployed position. In the open position, the cover 66 provides access to the connector module latch 95 to permit the connector module 80 to be rotated between the stowed and deployed positions. As shown, a thumb latch 67 provided on the cover 66 may be grasped to assist in opening the cover 66. The thumb latch 67 maybe rotated, depressed or otherwise positioned to lock the cover 66 in the closed position. Furthermore, means (not shown) may be provided for locking the thumb latch 67 to prevent unauthorized access to the connector modules 80. The mounting frame 62 further comprises a plurality of connector module housing outer radius guides 68 and a plurality of connector module housing inner radius guides 69. Each outer radius guide 68 transitions optical fiber, for example braided tubing with 900 micron optical fiber, jumpers, or buffered tube optical fiber, between the transition box 70 and a connector module 80, as will be described hereinafter. Each inner radius guide 69 transitions optical fiber, and particularly jumpers, between a connector module 80 and the IBU 120, as will be described hereinafter. Accordingly, there is an outer radius guide 68 and an inner radius guide 69 corresponding to each connector module 80 mounted on the connector module housing 60. As shown herein, the connector module housing 60 is configured with 12 connect modules 80, 12 outer radius guides 68 and 12 inner radius guides 69. The outer radius guides 68 and the inner radius guides 69 are rotatably mounted on the vertical shaft 62*a* (FIG. 39) so that the radius guides 68, 69 float relative to the mounting frame 62 and the corresponding connector module 80. In this manner, the optical fiber or jumper is free to move without inducing bending stresses as the connector module 80 is rotated between the stowed and deployed positions. The routing surfaces of the radius guides 68, 69 each have a predetermined radius, typically at least about 1.5 inches, to maintain the minimum bend radius of the transitioning optical fiber or jumper.

Each connector module 80 comprises a support plate 82 and a tray 84 attached to the support plate 82. The support plate 82 is made of a rigid material, such as metal or reinforced plastic or composite, for providing strength and stiffness to the connector module 80 as necessary to meet industry and governmental seismic requirements. The support plate 82 may have any suitable form and comprises a free end 81 having a hole for receiving a fastener to secure support plate 82 rotatably to the vertical shaft 62*a* of the mounting frame 62 of the connector module housing 60. The tray 84 is made of a lightweight, substantially rigid material, such as molded plastic. The upper surface of the support plate 82 and the tray 84 are configured to define an interior compartment 85 for receiving optical fiber and jumpers transitioning through the connector module 80. As shown, an optional slack storage hub 88 is mounted on the upper surface of the support plate 82 adjacent the entrance 83 of the connector module 80 and a plurality of fiber optic adapters 90 are mounted on an adapter panel between the sides of the tray 84 and positioned medially within the interior compartment 85 in a known manner. The connector module 80 may further comprise one or more optical fiber radius guides 86 mounted on the upper surface of the tray 84 for maintaining the minimum bend radius of the optical fiber entering the connector module 80, and one or more retaining flanges 87 for retaining the optical fiber on the slack storage hub 88. The fiber optic adapters 90 shown herein are SC type adapters available from Corning Cable Systems LLC of Hickory, N.C. However, the fiber optic adapters 90 form no part of the invention and the connector module 80 may be configured to house any type of adapter, including for example LC, ST, or FC, without departing from the intended scope of the invention. The connector modules 80 are shown herein with 12 fiber optic adapters 90, but each connector module 80 may be configured with any number of adapters suitable to provide the particular density of terminations required for the communications network.

As shown, the connector module 80 is also provided with a plurality of jumper radius guides 92 and a jumper routing hub 94 for maintaining the minimum bend radius of the optical fiber, and particularly jumpers, exiting the connector module 80. Preferably, the number of jumper radius guides 92 corresponds to the number of fiber optic adapters 90 mounted on the adapter panel. Furthermore, one or more retaining flanges 97 may be provided between the jumper radius guides 92 and the exit 93 of the connector module 80 for retaining the jumpers within the tray 84. The connector module 80 also comprises a connector module latch 95 positioned on the outer surface of the wall 89 of the connector module 80. The connector module latch 95 may be grasped to rotate the connector module 80 horizontally about the vertical shaft 62*a* between the deployed and stowed positions as previously described. Preferably, the connector module latch 95 is made of a flexible material, such as plastic, so that the connector module latch 95 may engage a detent provided on the mounting frame 62 of the connector module housing 60 to secure the connector module 80 in the stowed position. As best shown in FIG. 36, an optional light emitting diode (LED) 98 may be provided on the lower portion of each fiber optic adapter 90 and a corresponding light transmitting lens 99 may be provided opposite the fiber optic adapters 90. The LEDs 98 are aligned with the lens 99 and pointed forwardly when the connector module 80 is in the stowed position or the deployed position. The LEDs 98 may be energized to locate the fiber optic adapter 90 for a particular termination on a particular connector module 80 within the communications network. Operation of the LEDs 98 in this manner is commonly referred to in the art as a "searchlight" procedure. It should be noted that the shape and configuration of the connector module 80, and in particular the support plate 82 and the tray 84, is not limited to the shape and configuration depicted herein, and thus, should not be construed to limit the scope of the invention in any manner. Furthermore, the optical fiber radius guides 86, the slack storage hub 88, the jumper radius guides 92 and the jumper routing hub 94 each have a predetermined radius, typically at least about 1.5 inches, to maintain the minimum bend radius of the transitioning optical fiber or jumper.

The transition box 70 is attached to the mounting frame 62 adjacent the rearward end 61 of the connector module housing 60. The transition box 70 and the mounting frame 62 are secured together to the external mounting flange 107 of the upright 104. The transition box 70 transitions optical fiber between the communications network and the connector modules 80 on the distribution frame 50, 150, 250. As shown, the distribution box 70 is generally L-shaped to conform to the shape of the rearward end 61 of the mounting frame 62 and the external mounting flange 107 of the upright 104. Cable strain relief flanges 72 are provided on the outer wall 71 of the transition box 70 for securing a cable strain relief device (not shown) to the transition box 70. Preferably, the cable strain relief flanges 72 have one or more holes 73 for receiving fasteners, for example threaded bolts, to secure the cable strain relief device to the flanges 72. In an exemplary embodiment, the cable strain relief device is a universal cable clamp with means for strain relieving one or more fiber optic cables comprising a plurality of optical fibers. The transition box 70 defines an interior cavity 75 for routing and storing optical fiber, as will be described hereinafter. A transition box upper routing hub 74 and a transition box lower routing hub 76 are secured to the rear wall 77 or to the outer wall 71 of the transition box 70. The upper routing hub 74 and the lower routing hub 76 store and route optical fiber from the fiber optic cable stain relieved to the cable strain relief flanges 72. The optical fiber is eventually routed to the appropriate outer radius guide 68 and connector module 80, as will be described hereinafter. The transition box upper routing hub 74 and the transition box lower routing hub 76 each have a predetermined radius, typically at least about 1.5 inches, to maintain the minimum bend radius of the transitioning optical fiber.

Figure 40:
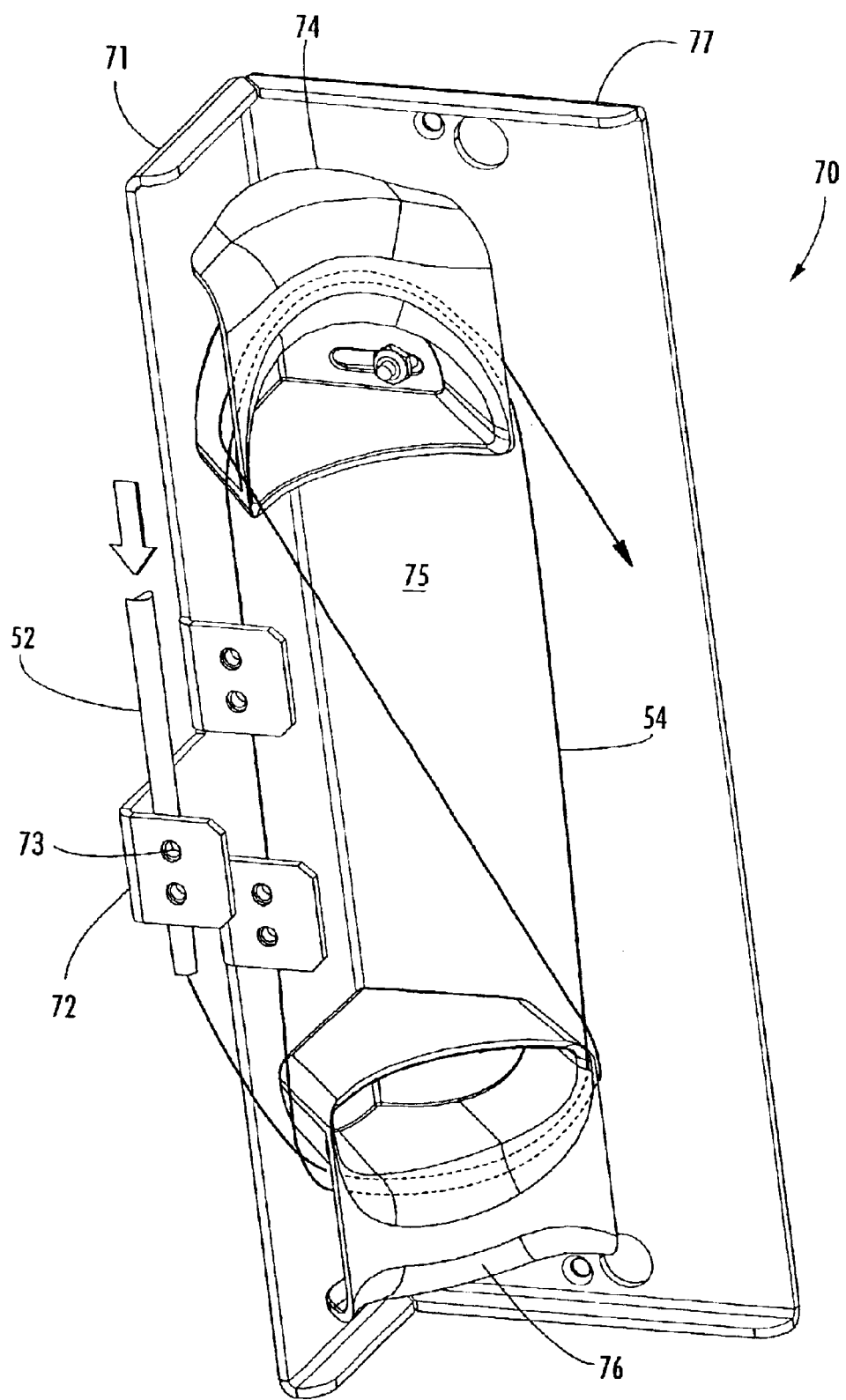
FIG. 40 is a right front perspective view of the transition box of the connector module housing shown in FIG. 30 illustrating an exemplary method of routing and storing optical fiber according to the invention.

FIG. 40 illustrates an exemplary embodiment of a method according to the invention for transitioning the optical fiber between the communications network and a representative connector module 80. As illustrated in FIG. 40, a fiber optic cable 52 comprising a plurality of optical fibers 54 is routed to the transition box 70 from one of the cutouts 101 provided on the frame assembly 100. As shown, the fiber optic cable 52 is routed downwardly into the transition box 70. However, the fiber optic cable 52 may be routed either upwardly or downwardly into the transition box 70 depending upon preference or the requirements of the communications network. The fiber optic cable 52 is strain relieved at the cable strain relief flanges 72 and the outer sheath of the fiber optic cable 52 is removed to expose the optical fibers 54. For purposes of greater clarity, only a representative one of the optical fibers 54 is shown and described. The optical fiber 54 is routed around the transition box lower routing hub 76 and upwardly to the transition box upper routing hub 74. If desired, one or more loops of slack optical fiber 54 (one shown) may be made and stored on the upper and lower routing hubs 74, 76. Thereafter, the optical fiber 54 is routed around the upper routing hub 74 in an S-shaped travel path so that the optical fiber 54 exits the upper routing hub 74 in a downward direction. It has been found that routing the optical fiber 54 in the S-shaped travel path improves the manner in which the optical fiber 54 lays in the transition box 70. The optical fiber 54 then passes through the outer radius guide 68 of the mounting frame 62 and into the entrance 83 of the appropriate connector module 80 (see FIG. 32).

Figure 41:
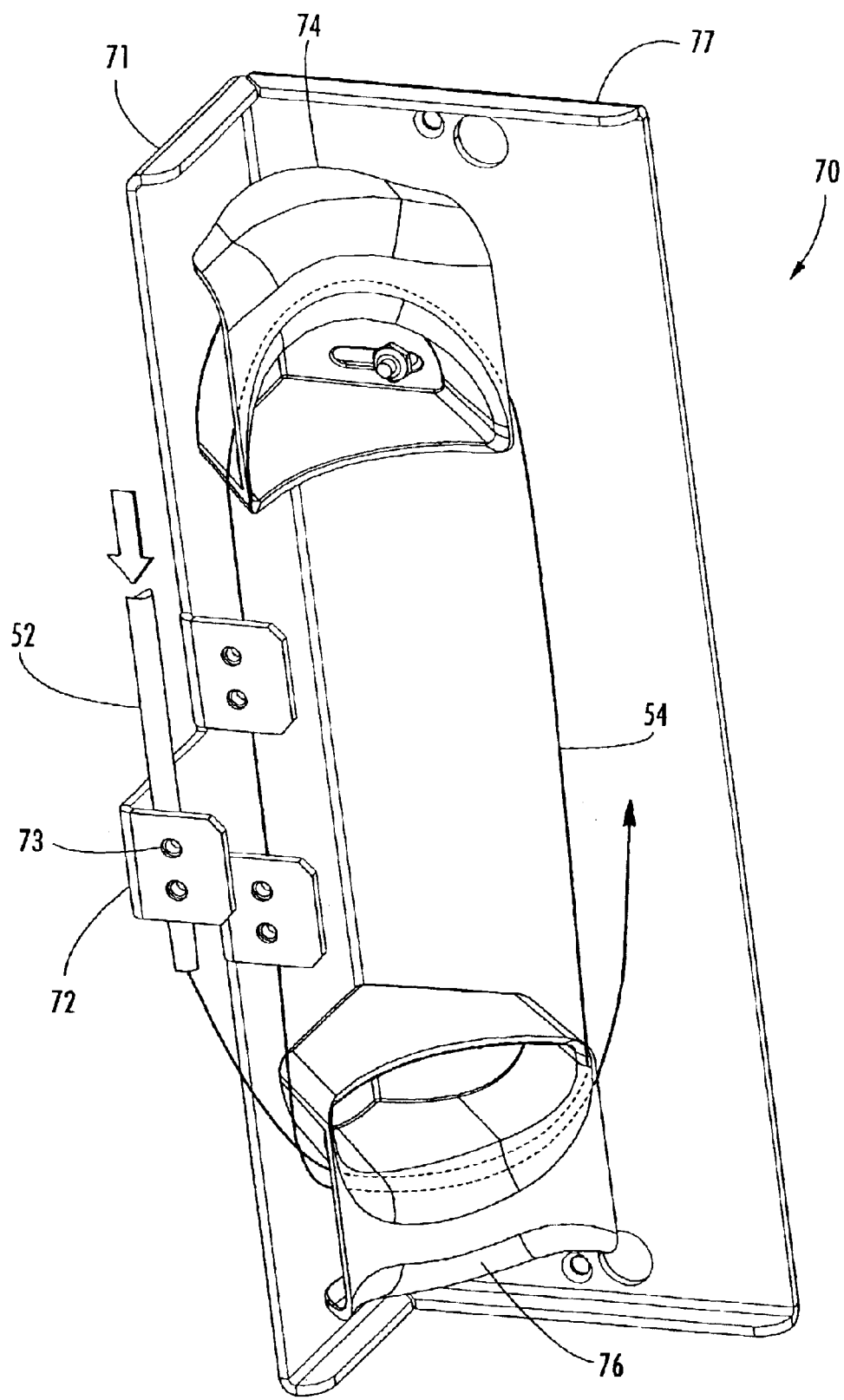
FIG. 41 is a right front perspective view of the transition box of the connector module housing shown in FIG. 30 illustrating another exemplary method of routing and storing optical fiber according to the invention.

FIG. 41 illustrates another exemplary embodiment of a method according to the invention for transitioning the optical fiber between the communications network and a representative connector module 80. As illustrated in FIG. 41, a fiber optic cable 52 comprising a plurality of optical fibers 54 is routed to the transition box 70 from one of the cutouts 101 provided on the frame assembly 100. As shown, the fiber optic cable 52 is routed downwardly into the transition box 70. However, the fiber optic cable 52 may be routed either upwardly or downwardly into the transition box 70 depending upon preference or the requirements of the communications network. The fiber optic cable 52 is strain relieved at the cable strain relief flanges 72 and the outer sheath of the fiber optic cable 52 is removed to expose the optical fibers 54. For purposes of greater clarity, only a representative one of the optical fibers 54 is shown and described. The optical fiber 54 is routed around the transition box lower routing hub 76 and upwardly to the transition box upper routing hub 74. If desired, one or more loops of slack optical fiber 54 (one shown) may be made and stored on the upper and lower routing hubs 74, 76. Thereafter, the optical fiber 54 exits the lower routing hub 76 in an upward direction. The optical fiber 54 then passes through the outer radius guide 68 of the mounting frame 62 and into the entrance 83 of the appropriate connector module 80 (see FIG. 32).

Figure 42:
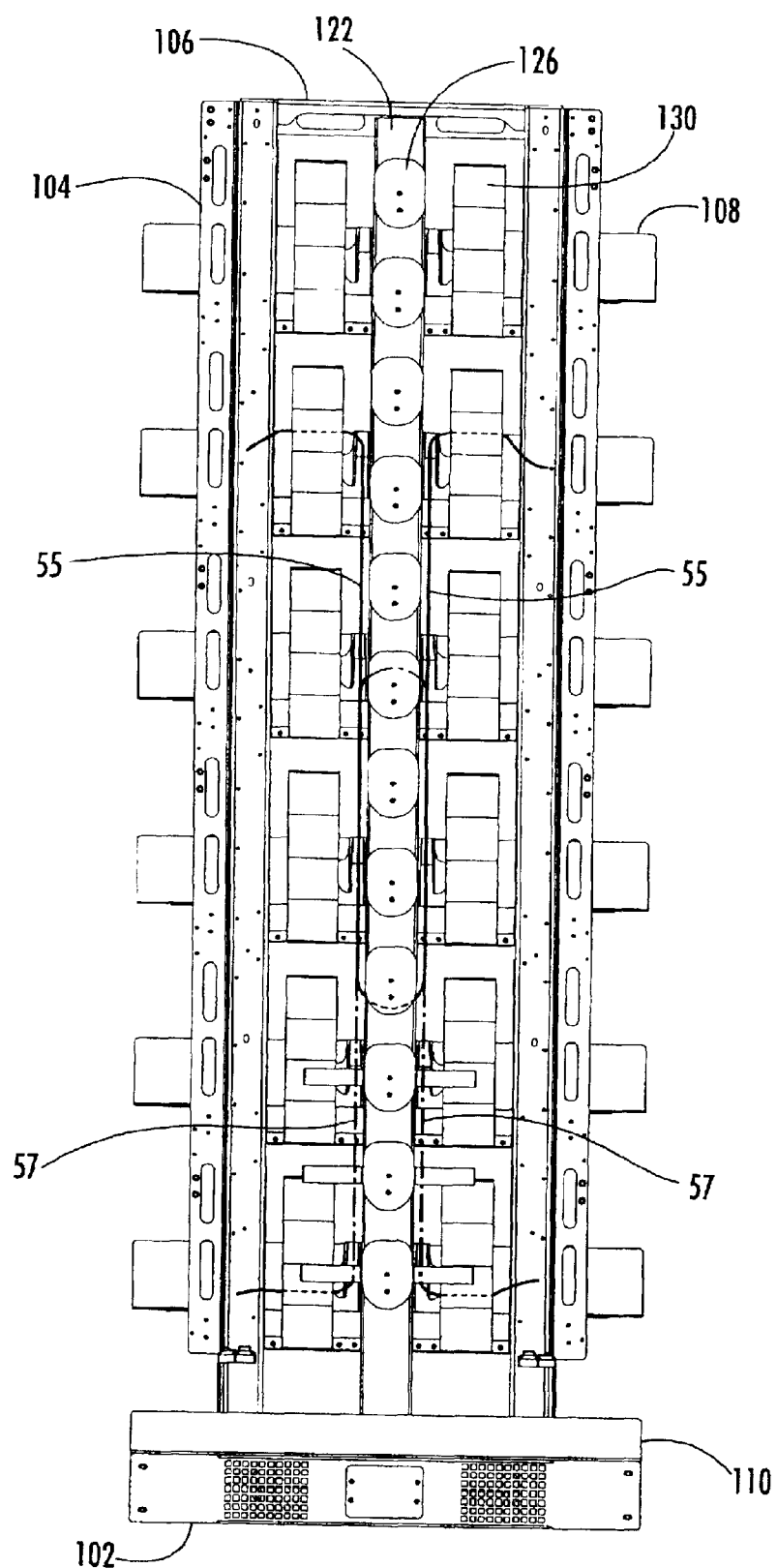
FIG. 42 is front elevation view of the frame assembly shown in FIG. 8 illustrating an exemplary method of routing ½ single length fiber optic jumpers in accordance with the invention.
Figure 43:
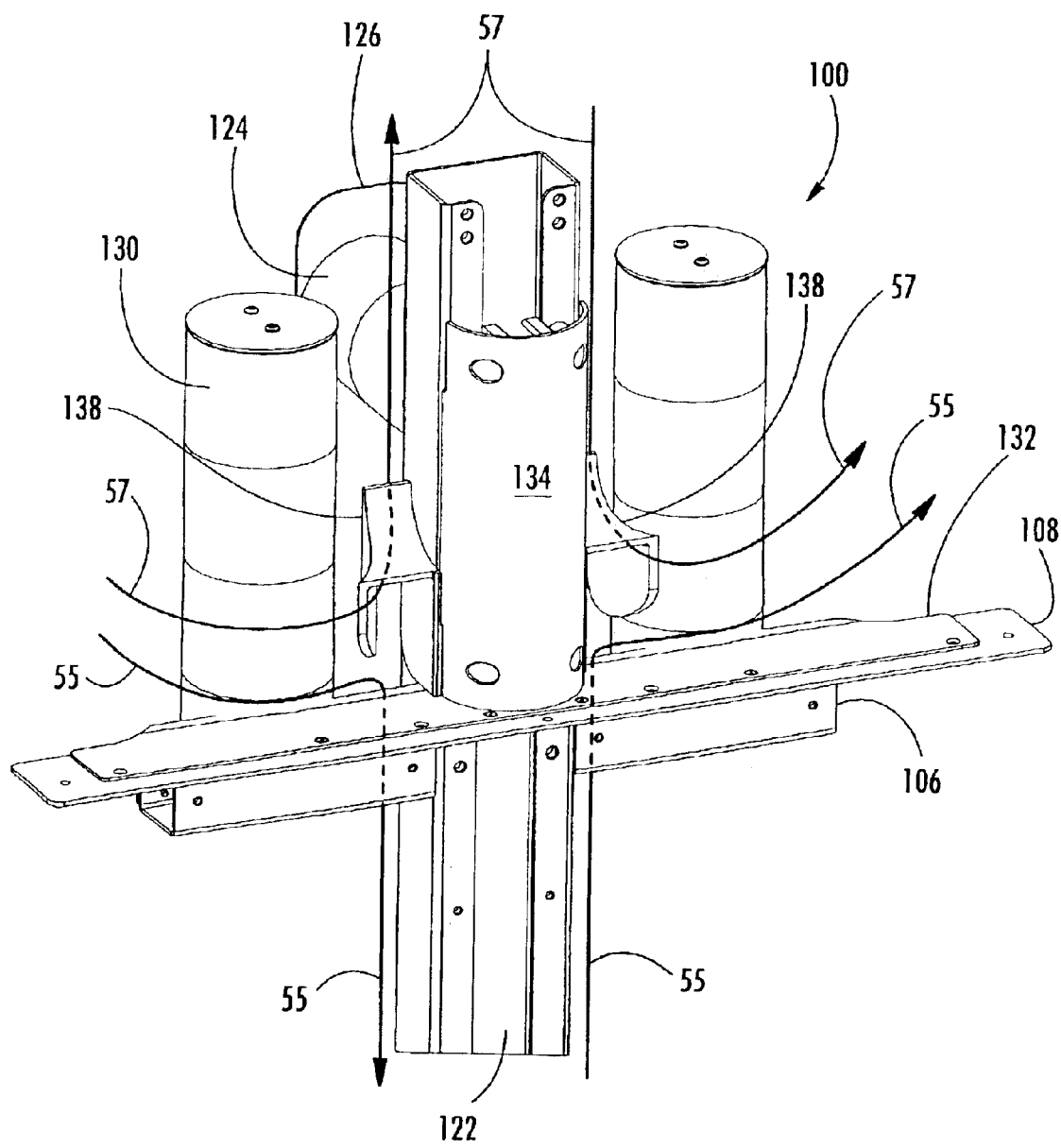
FIG. 43 is an enlarged rear perspective view further illustrating the method of FIG. 42 with certain components of the frame assembly removed for purposes of greater clarity.
Figure 44:
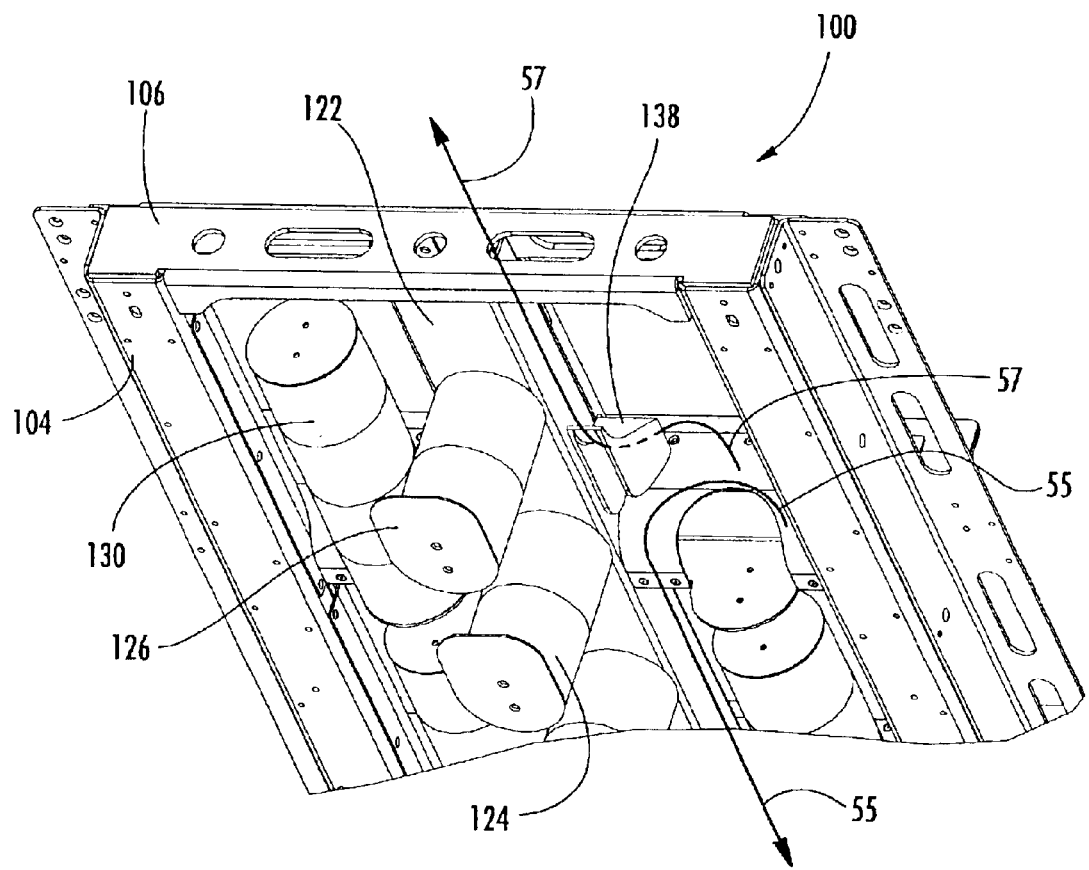
FIG. 44 is an enlarged front perspective view further illustrating the method of FIG. 42 with certain components of the frame assembly removed for purposes of greater clarity.

FIGS. 42–44 illustrate an exemplary embodiment of a method according to the invention for improving the jumper routing between the connector modules 80 and the IBU 120 of the distribution frame 50, 150, 250. For simplicity and ease of manufacture, a single length jumper 56 (FIG. 32) is typically utilized to connect optical fibers 54 from connector modules 80 mounted in the left-hand connector module housings with optical fibers 54 from connector modules 80 mounted in the right-hand connector modules. Accordingly, each jumper 56 must be long enough to extend between the terminations that are farthest apart on the distribution frame 50, 150, 250. As a result, the majority of the terminations employ jumpers 56 having excess lengths of slack that must be stored on the IBU 120. The jumpers 56 having excess lengths of slack contribute to jumper pile-up at the base of the IBU 120. A method according to the invention permits the length of the single length jumper 56 to be only half as long as the conventional single length jumper. As shown in FIG. 42, certain of the jumpers 55 transitioning between a left-hand connector module housing and a right-hand connector module housing are routed downwardly on the IBU 120 and certain of the jumpers 57 transitioning between a left-hand connector module housing and a right-hand connector module housing are routed upwardly on the IBU 120. In particular, the ½ single length jumpers 55, 57 are not first routed downwardly to the base 102 and around an angled IBU routing hub 140. Accordingly, the angled IBU routing hubs 140 and the angled IBU routing hub support bracket 142 can be eliminated from the frame assembly 100. Instead, the ½ single length jumpers 55, 57 are routed directly from one connector module housing 60 onto an appropriate horizontal IBU hub 124 on the IBU 120 and then directly to the other connector module housing 60.

FIGS. 43 and 44 illustrate the routing of representative ½ single length jumpers 55, 57 in greater detail. A ½ single length jumper 55 exiting a connector module 80 of a right-hand connector module housing through the exit 93 transitions around the vertical IBU routing hub 130 (removed in FIG. 44 for purposes of greater clarity) and downwardly over the transition radius guide 132 attached to the rear trough 108. The jumper 55 is then routed downwardly parallel to the vertical member 122 of the IBU 120 to a horizontal IBU hub 124 that is located at a distance sufficient to manage the slack length of the jumper 55. The jumper 55 transitions around the horizontal IBU hub 124 and is routed upwardly parallel to the vertical member 122 of the IBU 120 to the cross member 106 nearest to the connector module 80 of the left-hand connector module housing in which the jumper 55 will be terminated. The jumper 55 transitions over the transition radius guide 132 attached to the corresponding rear trough 108 and around the vertical IBU routing hub 130 into the left-hand connector module housing through the exit 93. Similarly, a ½ single length jumper 57 exiting a connector module 80 of a right-hand connector module housing through the exit 93 transitions around the vertical IBU routing hub 130 (removed in FIG. 44 for purposes of greater clarity) and upwardly over a ½ single length jumper radius guide 138 attached to the vertical member 122 of the IBU 120. The jumper 57 is then routed upwardly parallel to the vertical member 122 of the IBU 120 to a horizontal IBU hub 124 that is located at a distance sufficient to manage the slack length of the jumper 57. The jumper 57 transitions around the horizontal IBU hub 124 and is routed downwardly parallel to the vertical member 122 of the IBU 120 to the ½ single length jumper radius guide 138 nearest to the connector module 80 of the left-hand connector module housing in which the jumper 57 will be terminated. The jumper 57 transitions over the ½ single length jumper radius guide 138 and around the vertical IBU routing hub 130 into the left-hand connector module housing through the exit 93.

That which is claimed is:

1. A distribution frame for routing an optical fiber comprising:
    a first fiber connection area comprising at least one connector module movably mounted on the distribution frame, the connector module comprising at least one fiber optic adapter, the connector module movable to provide access to the fiber optic adapter;
    a second fiber connection area comprising at least one connector module movably mounted on the distribution frame, the connector module comprising at least one fiber optic adapter, the connector module movable to provide access to the fiber optic adapter; and
    a fiber management area medially disposed between the first fiber connection area and the second fiber connection area;
    wherein the first fiber connection area further comprises at least one connector module housing fixed to the distribution frame, the connector module housing comprising a mounting frame having a rearward end, a forward end and a vertical shaft adjacent the rearward end with the connector module rotatably attached to the vertical shaft.

2. A distribution frame according to claim 1 wherein the connector module is mounted within the connector module housing and rotatable in the direction of the fiber management area between a stowed position wherein the fiber optic adapter is not accessible and a deployed position wherein the fiber optic adapter is accessible.

3. A distribution frame according to claim 1 wherein the connector module housing further comprises a cover adjacent the forward end for securing the connector module within the connector module housing in the stowed position.

4. A distribution frame according to claim 1 wherein the connector module housing further comprises at least one inner radius guide for transitioning the optical fiber between the connector module and the fiber management area.

5. A distribution frame according to claim 1 wherein the connector module housing comprises a transition box attached to the mounting frame.

6. A distribution frame according to claim 5 wherein the transition box comprises at least one cable strain relief flange for strain relieving a fiber optic cable to the connector module housing.

7. A distribution fame according to claim 5 wherein the transition box comprises at least one routing hub for transitioning the optical fiber into the connector module housing while maintaining the minimum bend radius of the optical fiber.

8. A distribution frame according to claim 5 wherein the transition box comprises at least one lower routing hub for transitioning the optical fiber into the connector module while maintaining the minimum bend radius of the optical fiber and at least one upper routing hub for transitioning the optical fiber into the connector module while maintaining the minimum bend radius of the optical fiber.

9. A distribution frame according to claim 5 wherein the connector module housing further comprises at least one outer radius guide for transitioning the optical fiber between the transition box and the connector module.

10. A distribution frame according to claim 1 wherein the connector module further comprises a support plate having a free end and a tray defining an entrance, an interior compartment and an exit for receiving the optical fiber transitioning through the connector module.

11. A distribution frame according to claim 10 wherein the connector module further comprises a slack storage hub mounted on the support plate within the interior compartment for storing slack lengths of the optical fiber while maintain the minimum bend radius of the optical fiber.

12. A distribution frame according to claim 2 wherein the connector module further comprises a light emitting diode (LED) associated with the fiber optic adapter and a lens and wherein the LED is visible through the lens when the connector nodule is in the stowed position.

13. A distribution frame according to claim 1 further comprising at least one vertical routing hub for transitioning the optical fiber between the connector module and the fiber management area while maintaining the minimum bend radius of the optical fiber.

14. A distribution frame according to claim 1 further comprising at least one angled routing hub for transitioning the optical fiber between the connector module and the fiber management area while maintaining the minimum bend radius of the optical fiber.

15. A distribution frame according to claim 1 further comprising at least one upright having a curved inner portion for transitioning the optical fiber between the connector module and the fiber management area while maintaining the minimum bend radius of the optical fiber.

16. A distribution frame according to claim 1 wherein the fiber management area comprises an Interbay Storage Unit (IBU), the IBU comprising a vertical member and at least one horizontal IBU hub depending from the vertical member for storing the optical fiber while maintaining the minimum bend radius of the optical fiber.

17. A distribution frame for routing an optical fiber comprising:
    a first fiber connection area comprising at least one connector module movably mounted on the distribution frame, the connector module comprising at least one fiber optic adapter, the connector module movable to provide access to the fiber optic adapter;
a second fiber connection area comprising at least one connector module movably mounted on the distribution frame, the connector module comprising at least one fiber optic adapter, the connector module movable to provide access to the fiber optic adapter; and
a fiber management area medially disposed between the first fiber connection area and the second fiber connection area;
wherein the first fiber connection area further comprises at least one connect or module housing fixed to the distribution frame, the connector module housing comprising a mounting frame having a rearward end and a forward end; and
wherein the connector module housing further comprises an upper support rail extending between the rearward end and the forward end of the mounting frame and a lower support rail extending between the rearward end and the forward end of the mounting frame, the lower support rail engaging the upper support rail of an adjacent connector module housing to secure the connector module housings together.

18. A connector module housing for routing an optical fiber on a distribution frame, the connector module housing comprising:
a mounting frame having a rearward end and a forward end;
a vertical shaft adjacent the rearward end of the mounting frame; and
at least one connector module movably attached to the vertical shaft within the connector module housing, the connector module comprising at least one fiber optic adapter, the connector module movable to provide access to the fiber optic adapter.

19. A connector module housing according to claim 18 wherein the connector module is movable between a stowed position wherein the fiber optic adapter is not accessible and a deployed position wherein the fiber optic adapter is accessible.

20. A connector module housing according to claim 19 further comprising a cover adjacent the forward end for securing the connector module within the connector module housing in the stowed position.

21. A connector module housing according to claim 18 further comprising at least one inner radius guide for transitioning the optical fiber into the connector module.

22. A connector module housing according to claim 18 further comprising a transition box attached to the mounting frame.

23. A connector module housing according to claim 22 wherein the transition box comprises at least one cable strain relief flange for strain relieving a fiber optic cable to the connector module housing.

24. A connector module housing according to claim 22 wherein the transition box comprises at least one routing hub for transitioning the optical fiber into the connector module housing while maintain the minimum bend radius of the optical fiber.

25. A connector module housing according to claim 22 wherein the transition box comprises at least one lower routing hub for transitioning the optical fiber into the connector module while maintaining the minimum bend radius of the optical fiber and at least one upper routing hub for transitioning the optical fiber into the connector module while maintaining the minimum bend radius of the optical fiber.

26. A connector module housing according to claim 22 further comprising at least one outer radius guide for transitioning the optical fiber between the transition box and the connector module.

27. A connector module housing according to claim 18 wherein the connector module further comprises a support plate having a free end and a tray defining an entrance, an interior compartment and an exit for receiving the optical fiber transitioning through the connector module.

28. A connector module housing according to claim 27 wherein the connector module further comprises a slack storage hub mounted on the support plate within the interior compartment for storing slack lengths of the optical fiber while maintaining the minimum bend radius of the optical fiber.

29. A connector module housing according to claim 19 wherein the connector module ether comprises a light emitting diode (LED) associated with the fiber optic adapter and a lens and where the LED is visible through the lens when the connector module is in the stowed position.

30. A connector module housing comprising:
a mounting frame having a rearward end and a forward end;
a vertical shaft adjacent the rearward end of the mounting frame;
at least one connector module movably attached to the vertical shaft within the connector module housing, the connector module comprising at least one fiber optic adapter, the connector module movable to provide access to the fiber optic adapter; and
an upper support rail extending between the rearward end and the forward end of the mounting frame and a lower support rail extending between the rearward end and the forward end of the mounting frame, the lower support rail engaging the upper support rail of an adjacent connector module housing to secure the connector module housings together.

31. A method of routing optical fibers in the form of single length jumpers on a distribution frame comprising a first fiber connection area, a second fiber connection area and a fiber management area disposed between the first fiber connection area and the second fiber connection area, the method comprising:
providing at least one connector module housing mounted on the distribution frame in the first fiber connection area and the second fiber connection area, the connector module housing comprising a mounting frame having a rearward end and a forward end, a vertical shaft adjacent the rearward end of the mounting frame and at least one connector module movably attached to the vertical shaft;
transitioning a first single length jumper from the first fiber connection area to an upper portion of the fiber management area;
routing the first single length jumper downwardly and then upwardly within the fiber management area;
transitioning the first single length jumper from the upper portion of the fiber management area to the second fiber connection area;
transitioning a second single length jumper from the first fiber connection area to a lower portion of the fiber management area;
routing the second single length jumper upwardly and then downwardly within the fiber management area; and
transitioning the second single length jumper from the lower portion of the fiber management area to the second fiber connection area.

32. A method according to claim 31 wherein each of the steps of transitioning and routing comprises the additional step of maintaining the minimum bend radius of the optical fiber.

33. A method according to claim 31 wherein the distribution frame further comprises an Interbay Storage Unit (IBU), the IBU comprising a vertical member and at least one horizontal IBU hub depending from the vertical member for storing the first and second single length jumpers while maintaining the minimum bend radius of the optical fiber.

* * * * *